US012125098B2

(12) United States Patent
Chandrasekar et al.

(10) Patent No.: US 12,125,098 B2
(45) Date of Patent: Oct. 22, 2024

(54) METHOD AND TRANSACTION TRACKING SERVICE FOR SURFACING RULE-CREATION ACTIONS

(71) Applicant: Intuit Inc., Mountain View, CA (US)

(72) Inventors: Prasannavenkatesh Chandrasekar, San Francisco, CA (US); Justin Eli Calles, San Francisco, CA (US); Mike Tai, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 183 days.

(21) Appl. No.: 17/560,125

(22) Filed: Dec. 22, 2021

(65) Prior Publication Data

US 2022/0114659 A1  Apr. 14, 2022

Related U.S. Application Data

(62) Division of application No. 15/365,903, filed on Nov. 30, 2016, now Pat. No. 11,244,384.

(51) Int. Cl.
*G06Q 40/00* (2023.01)
*G06F 3/0481* (2022.01)
*G06F 3/04883* (2022.01)
*G06Q 40/02* (2023.01)
*G06F 3/0484* (2022.01)

(52) U.S. Cl.
CPC ........... *G06Q 40/02* (2013.01); *G06F 3/0481* (2013.01); *G06F 3/04883* (2013.01); *G06F 3/0484* (2013.01)

(58) Field of Classification Search
CPC .......... G06Q 40/02; G06Q 40/03; G06F 3/04; G06F 3/0481; G06F 3/0484; G06F 3/04883

USPC .................................................. 705/4, 35–45
See application file for complete search history.

(56) References Cited

U.S. PATENT DOCUMENTS

| 8,447,666 | B1 | 5/2013 | Keld |
| 9,116,763 | B2 * | 8/2015 | Kumar ................ G06Q 20/102 |
| 2002/0013765 | A1 | 1/2002 | Shwartz |

(Continued)

FOREIGN PATENT DOCUMENTS

| CN | 104657364 A | * | 5/2015 | ....... G06F 17/30351 |
| JP | 2012118580 A | | 6/2012 | |

OTHER PUBLICATIONS

Purpose Accountants, "Xero TaxTouch App", Mar. 8, 2016, 3 pages.
MacWorld, "QuickBooks Online Self-Employed Review: Untangle your Business and Personal Expenses", Feb. 9, 2015, 9 pages.

*Primary Examiner* — Cho Kwong
*Assistant Examiner* — Mohammed H Mustafa
(74) *Attorney, Agent, or Firm* — Lathrop GPM LLP

(57) ABSTRACT

A transaction tracking service (TTS). The TTS includes a transaction repository configured to store transaction records organized within a transaction groups. The TTS also includes a computer processor operatively connected to the transaction repository. The computer processor is configured to execute instructions to make a first determination that a first transaction record of the plurality of transaction records is unassigned, generate, based on the first determination, an unassigned transaction list (UTL) comprising a first set of transaction data associated with the first transaction record, and transmit the UTL to a client device operatively connected to the TTS.

19 Claims, 19 Drawing Sheets

(56) References Cited

U.S. PATENT DOCUMENTS

| | | | |
|---|---|---|---|
| 2005/0231437 A1* | 10/2005 | Dai | H01Q 9/28 |
| | | | 343/795 |
| 2007/0288349 A1* | 12/2007 | Chang | G06Q 40/04 |
| | | | 705/37 |
| 2010/0094740 A1* | 4/2010 | Richter | G06Q 40/02 |
| | | | 705/35 |
| 2010/0191884 A1* | 7/2010 | Holenstein | G06F 16/2343 |
| | | | 707/613 |
| 2014/0046814 A1* | 2/2014 | Bater | G06Q 40/02 |
| | | | 705/30 |
| 2014/0105510 A1* | 4/2014 | Chelst | G06Q 40/12 |
| | | | 382/218 |
| 2014/0258063 A1* | 9/2014 | Chourasia | G06Q 40/00 |
| | | | 705/35 |
| 2016/0246473 A1 | 8/2016 | Jobs et al. | |
| 2016/0259627 A1* | 9/2016 | Michelsen | G06F 8/35 |
| 2017/0329615 A1 | 11/2017 | Kahn | |

\* cited by examiner

METHOD AND TRANSACTION TRACKING SERVICE FOR SURFACING RULE-CREATION ACTIONS

RELATED APPLICATIONS

This application is a divisional application of U.S. patent application Ser. No. 15/365,903, filed Nov. 30, 2016, now U.S. Pat. No. 11,244,384, the entirety of which is hereby incorporated by reference.

BACKGROUND

Individuals often review and categorize financial transactions imported directly from their respective financial institutions for the purpose of tracking debits and credits. For individuals who are overwhelmed with large numbers of transactions upon login, the effort expended on the categorization process tends to be quite cumbersome. Subsequently, a mechanism for substantially automating this categorization process is sought.

SUMMARY

In general, in one aspect, the invention relates to a transaction tracking service (TTS). The TTS includes a transaction repository configured to store a plurality of transaction records organized within a plurality of transaction groups, and a computer processor operatively connected to the transaction repository, wherein the computer processor is configured to execute instructions to make a first determination that a first transaction record of the plurality of transaction records is unassigned, generate, based on the first determination, an unassigned transaction list (UTL) comprising a first set of transaction data associated with the first transaction record, and transmit the UTL to a client device operatively connected to the TTS.

Other aspects of the invention will be apparent from the following description and the appended claims.

DETAILED DESCRIPTION

Figure 1A:
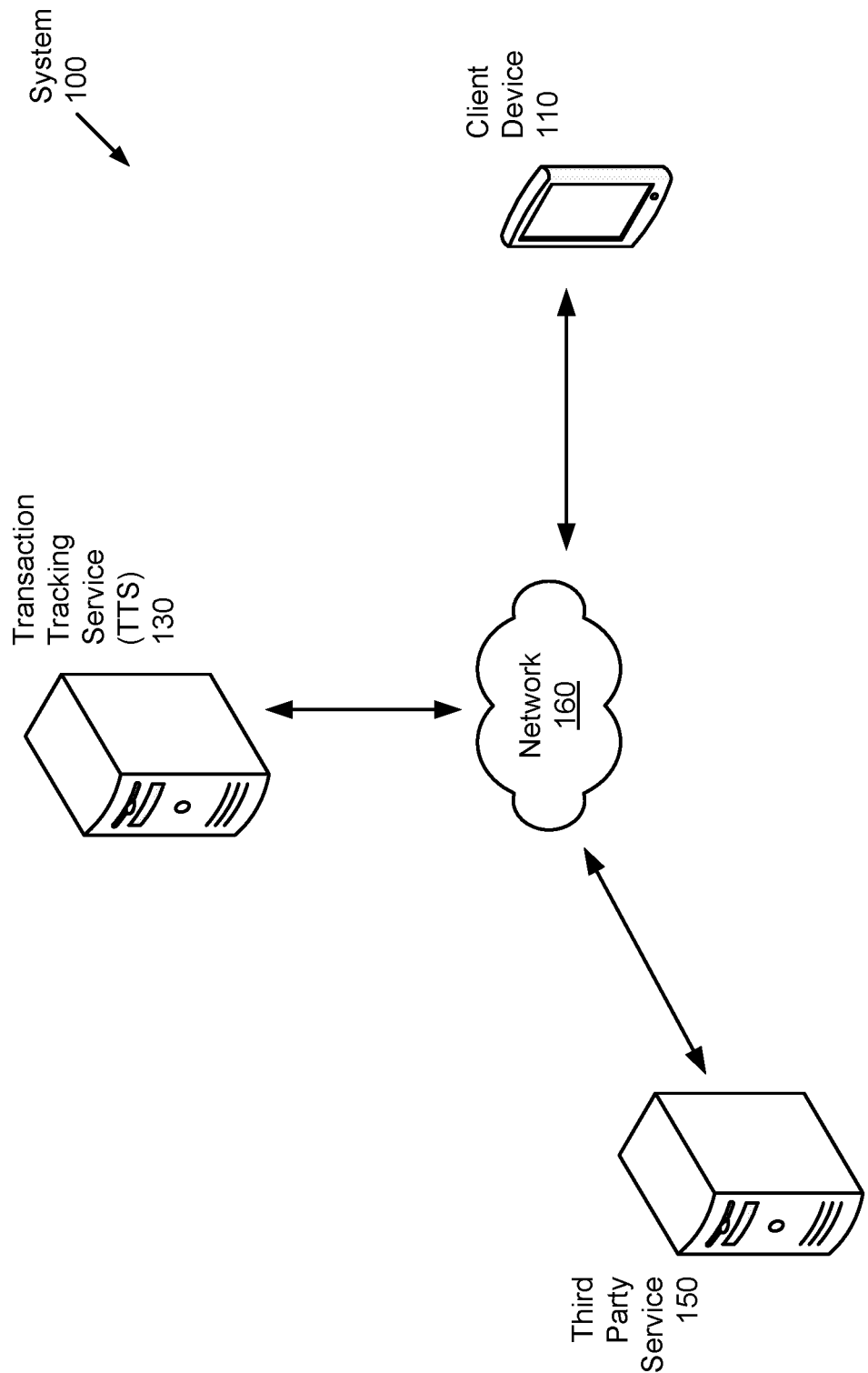
FIG. 1A shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description, any component description with regard to a figure, in various embodiments of the invention, may be equivalent to one or more like-named components described with regard to any other figure. For brevity, descriptions of these components will not be repeated with regard to each figure. Thus each and every embodiment of the components of each figure is incorporated by reference and assumed to be optionally present within every other figure having one or more liked-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

The invention relates to a method in which one or more transactions may be presented to a user via a client device for review. Each of the transactions, including a variety of transaction details associated with the transaction, is presented in a transaction cell. The user interacts with the transaction by swiping the corresponding transaction cell left or right, thus assigning the associated transaction to a specific category. Further, in detecting a swipe gesture across a transaction cell, a temporary (yet visible) pause of the swipe interaction is performed, alongside the presentation of an action prompt within or over the transaction cell directed to performing one or more actions relevant to the transaction. Constrained by a swipe pause timer (SPT) (discussed below), the user would subsequently be provided a short window of time in which to engage the action prompt in order to pursue the one or more aforementioned actions disclosed by the action prompt. If engagement of the action prompt is not pursued by the user prior to the elapsing of the SPT, the swipe interaction proceeds without hindering the speed with which the user typically reviews a transaction.

In one or more embodiments of the invention, an action prompt may be presented that is directed to a rule-creation action for the transaction. In these embodiments, a transaction record (for the transaction) may be categorized based on: (i) the transaction meeting criteria specified in rule element tuples corresponding to rules that may be applied to the transaction record; or (ii) engagement by a market user who, via a graphical user interface, selects the transaction group to which the transaction record is to be assigned. The market user may also be provided the ability to create new rules that may be applied to any existing and/or future generated transaction records. Moreover, application of the rules alleviates the burden on the market user to review and categorize a potentially overwhelming number of financial transactions. With rules, any financial transactions that meet criteria specified in the rules are automatically assigned to appropriate transaction groups, thereby leaving few, if any, financial transactions with which interaction is required by the market user.

In one or more other embodiments of the invention, an action prompt may be presented that is directed to providing content relating to the transaction. In these embodiments, the content provided may be retrievable documentation associated with the transaction, such as a receipt, an invoice, an image, etc., which may be useful to the user when reviewing the transaction for recollection, organization, etc. The content provided through the action prompt may be retrieved by comparison of the transaction details associated with the transaction (and populated in the transaction cell) with information disclosed on the content (e.g., a purchase amount, a vendor, etc.). Other actions may be pursued by an action prompt without departing from the scope of the invention.

FIG. 1A shows a system in accordance with one or more embodiments of the invention. The system (100) includes a client device (110), a transaction tracking service (TTS) (130), a third-party service (150), and a network (160). Each of these components is described below.

Figure 4A:
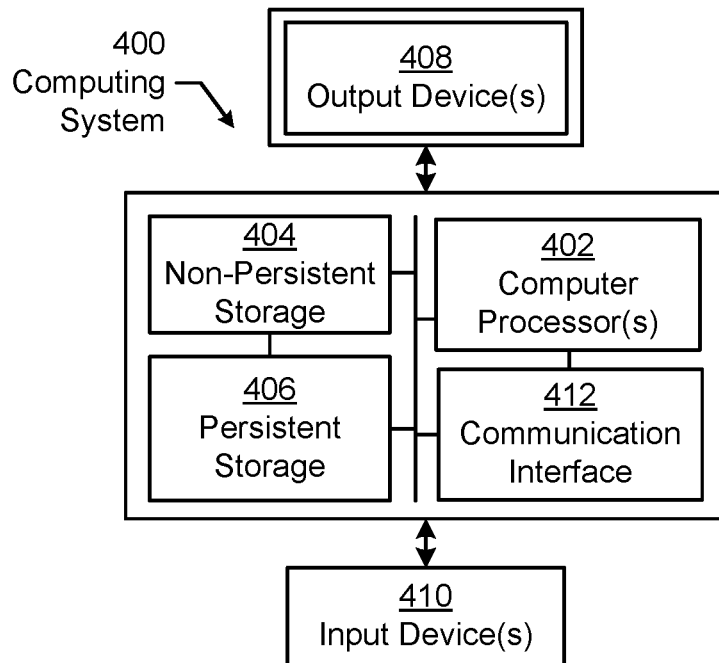
FIG. 4A and FIG. 4B show a computing system in accordance with one or more embodiments of the invention.
Figure 4B:
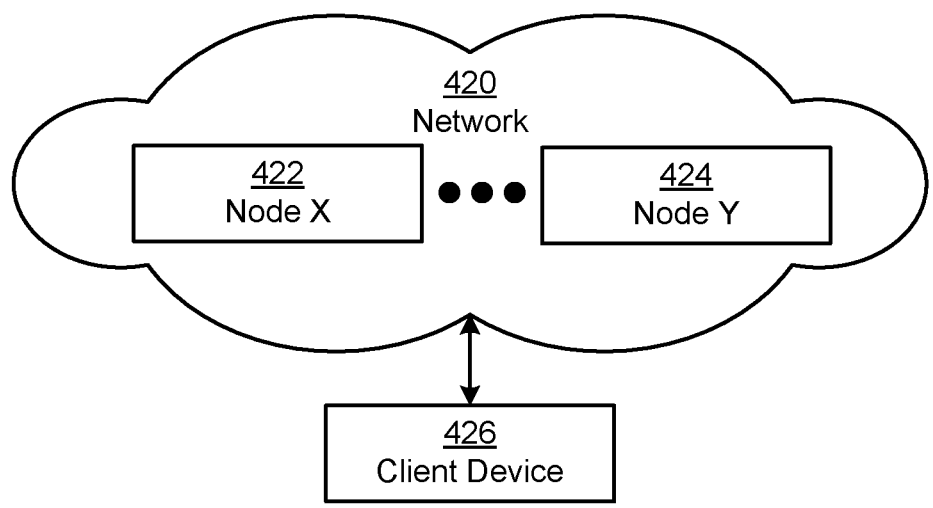

In one embodiment of the invention, the client device (110) may be any portable or non-portable computing system (see e.g., FIGS. 4A and 4B). The client device (110) may be operated by a market user of a software application (see e.g., FIG. 1B), wherein the software application is executing on the client device (110). In one embodiment of the invention, a market user may be a customer of the software application. For example, the market user may be a purchaser of the software application and/or an entity that acquires a general released version of the software application. Furthermore, the market user utilizes the software application per its intended use.

In one embodiment of the invention, the client device (110) may include functionality to: (i) receive, from the TTS (130), an unassigned transaction list (UTL) (see e.g., FIG. 1D); (ii) process, in conjunction with user input, the UTL to generate one or more rule element tuple(s) (RET) (discussed below); and (iii) transmit, to the TTS (130), the one or more RET for consolidation and rule-creation. The client device (110) may perform other functionalities without departing from the scope of the invention. Examples of a client device (110) include, but are not limited to, a smartphone, a tablet computer, a laptop computer, a desktop computer, a personal digital assistant (PDA), etc. The client device (110) is discussed in further detail below with respect to FIG. 1B.

In one embodiment of the invention, the TTS (130) may be a platform for the management of financial transactions centered about one or more market user(s) (discussed above). The TTS (130) may be hosted on a physical server (e.g., in a data center, or on a virtual server that may be cloud-based). The TTS (130) may be hosted on a single server, or alternatively, on multiple servers that are physical, virtual, or a combination thereof. In one embodiment of the invention, the TTS (130) may be hosted on any computing system similar to the exemplary computing system shown in FIGS. 4A and 4B.

In one embodiment of the invention, the TTS (130) may include functionality to: (i) submit, to one or more third-party service(s) (150), request(s) for transaction data associated with a market user; (ii) obtain, in response to the aforementioned request(s), transaction data associated with a market user from one or more third-party service(s) (150); (iii) generate one or more transaction record(s) using the obtained transaction data; (iv) assign the transaction record (s) to one or more transaction group(s) based on rules outlined in a rule table (see e.g., FIG. 1C); (v) generate a UTL using any remaining unassigned transaction record(s); (vi) transmit the UTL to the client device (110); (vii) receive, from the client device (110), one or more RET in response to the transmission of the UTL; (viii) update the rule table using the one or more RET; (ix) assign the unassigned transaction record(s) to one or more transaction group(s) based on the one or more RET; and (x) re-assign one or more pre-assigned transaction record(s) into different transaction groups based on the update to the rule table and/or the one or more RET. The TTS (130) may perform other functionalities without departing from the scope of the invention. The TTS (130) is discussed in further detail below with respect to FIG. 1C.

In one embodiment of the invention, a third-party service (150) may be a provider of financial services employed by a market user. A provider of financial services may be a financial institution, which may conduct and/or record financial transactions for the market user. Examples of financial transactions include those pertaining to, but not limited to, investments, loans, deposits, currency exchanges, credit lines, savings, money transfers, etc. In one embodiment of the invention, a third-party service (150) may include functionality to: (i) receive, from the TTS (130), request(s) for the transfer of transaction data pertaining to a market user; and (ii) in response to the request(s), transmit the appropriate transaction data to the TTS (130). A third-party service (150) may perform other functionalities without departing from the scope of the invention.

In one embodiment of the invention, a third-party service (150) may be hosted on a physical server (e.g., in a data center, or on a virtual server that may be cloud-based). The third-party service (150) may be hosted on a single server, or alternatively, on multiple servers that are physical, virtual, or a combination thereof. In one embodiment of the invention, the third-party service (150) may be hosted on any computing system similar to the exemplary computing system shown in FIGS. 4A and 4B.

In one embodiment of the invention, the network (160) may be the medium through which the client device (110), the TTS (130), and one or more third-party service(s) (150) are operatively connected. The connections between these aforementioned components may be wired and/or wireless, direct or indirect, temporary, permanent and/or intermittent, through a local area or wide area network, or include any other type of connection, or combination thereof. Further, the network (160) may employ any existing or future developed wired and/or wireless infrastructure and/or protocol, which may facilitate communications and/or the exchange of information between the various components of the system (100).

Figure 1B:
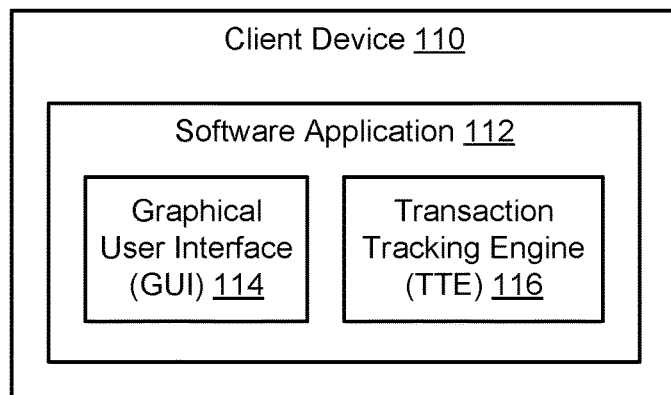
FIG. 1B shows a client device in accordance with one or more embodiments of the invention.

FIG. 1B shows a client device (110) in accordance with one or more embodiments of the invention. The client device (110) includes a software application (112) that executes on and/or interacts with the underlying hardware (e.g., computer processor, touchscreen, etc.) of the client device (110). In one embodiment of the invention, the software application (112) may be any computer program product that enables a market user to manage/consolidate transaction data from multiple sources (e.g., one or more third-party service(s) (150) via the TTS (130)). The term software application may include different versions and/or editions of the same software application. The software application (112) may be, for example, a mobile application, a web-based application, etc. In one embodiment of the invention, the software application (112) includes a graphical user interface (GUI) (114) and a transaction tracking engine (TTE) (116). Each of these components is described below.

In one embodiment of the invention, the GUI (114) may be an interface through which a user interacts with the software application (112) and/or the TTS (130). The GUI (114) may include functionality to: (i) present content (e.g., transaction data, the UTL, an action prompt, an action confirmation prompt, etc.) to the market user of the software application (112); and (ii) receive/detect input and/or commands from the market user. The GUI (114) may perform other functionalities without departing from the scope of the invention.

In one embodiment of the invention, actions may be performed, or content may be rendered, through the engagement or manipulation of graphical elements in the GUI (114). Examples of a graphical element include, but are not limited to, an editable text field, a list box, a pop-up menu, a push button, a radio button, a slider, a static text box, a checkbox, an icon, a toggle button, a transaction cell (see e.g., FIG. 1D), etc. Examples of engagement include, but are not limited to, a pressing or pushing of a button, a clicking of an icon, an entering of text and/or numbers in a text field, a selecting of a radio button or an action option, a toggling of a toggle button, a swiping of a transaction cell, etc. In one embodiment of the invention, the market user may manipulate or engage the graphical elements via employment of any input device (e.g., a keyboard, a mouse, a touchscreen, an electronic pen, etc.).

In one embodiment of the invention, the TTE (116) may be any hardware (e.g., circuitry), software, firmware, and/or any combination thereof that may include functionality to interface/interact with the TTS (130). In one embodiment of the invention, the TTE (116) may execute software instructions in the form of non-transitory computer readable program code described in detail below, with reference to FIG. 3B, FIG. 3C, and FIG. 3D. The instructions, when executed by a computer processor (e.g., an integrated circuit), may enable the TTE (116) to receive transaction data (e.g., a UTL) from the TTS (130), generate RET(s) assigning transaction record(s), corresponding to received transaction data, to transaction group(s), and subsequently, provide the RET(s) back to the TTS (130). In one embodiment of the invention, the TTE (116) may be an application programming interface (API) through which interaction/communication between the software application (112) and the TTS (130) is facilitated.

Figure 1C:
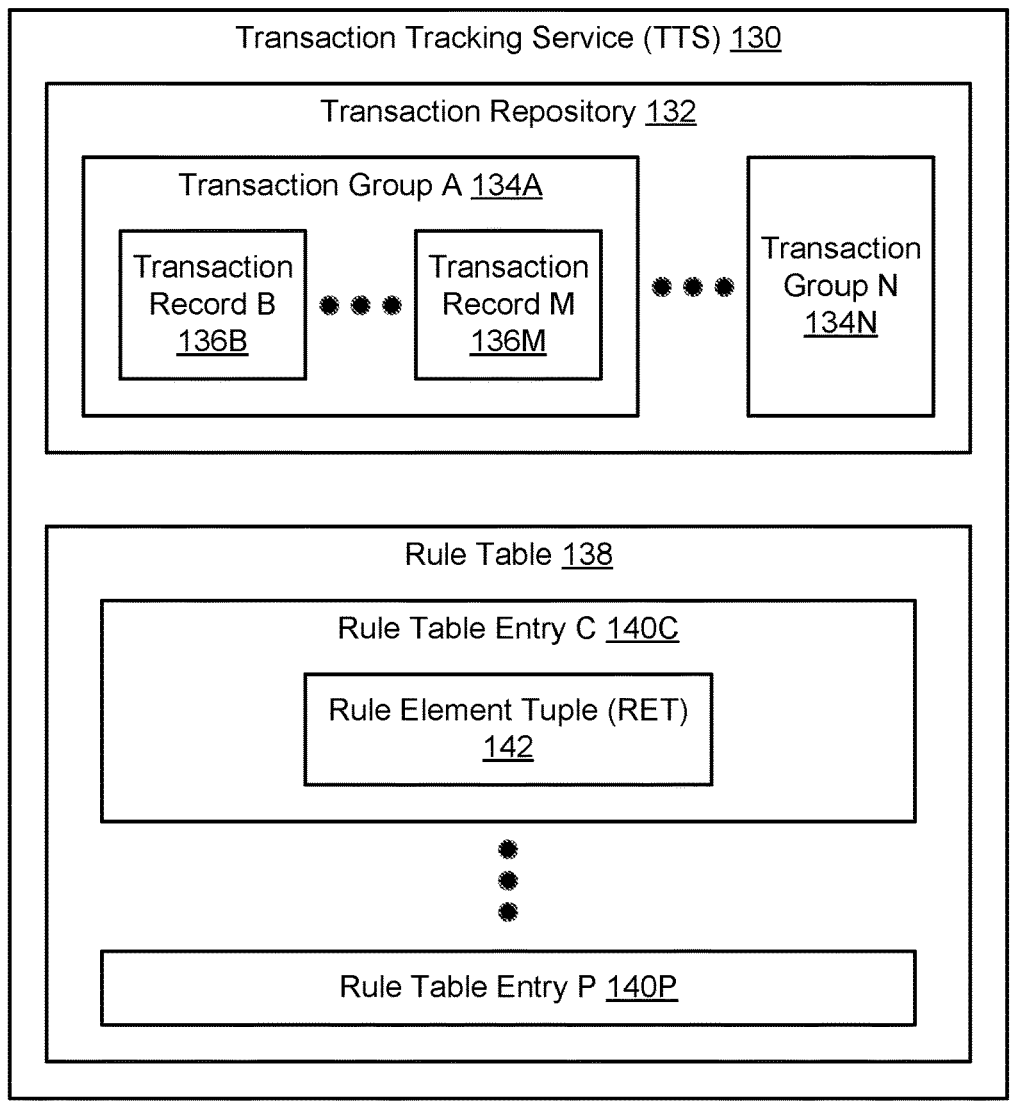
FIG. 1C shows a transaction tracking service in accordance with one or more embodiments of the invention.

FIG. 1C shows a transaction tracking service (TTS) (130) in accordance with one or more embodiments of the invention. The TTS (130) includes a transaction repository (132) and a rule table (138). Each of these components is described below.

In one embodiment of the invention, the transaction repository (132) may be any type of storage unit and/or device (e.g., a file system, database, collection of tables, or any other storage mechanism) for storing transaction data. Further, the transaction repository (132) may include multiple different storage units and/or devices. The multiple different storage units and/or devices may or may not be of the same type or located at the same physical site. In one embodiment of the invention, the transaction data stored in the transaction repository (132) may relate to transactions between a market user and various vendors, customers, government agencies, financial institutions, etc.

In one embodiment of the invention, transaction data may be stored in transaction records (136B, 136M). A separate transaction record (e.g., 136B) may exist for each transaction. In one embodiment of the invention, a transaction record (136B, 136M) may include transaction details that include, but are not limited to, a transaction amount, a transaction date and/or time, an entity (e.g., vendor, customer, etc.) involved in the transaction, a transaction description and/or summary, an account identifier for a bank or credit card account from/to which a transaction amount is debited or credited, etc.

In one embodiment of the invention, one or more transaction record(s) (136B, 136M) may be organized in one or more transaction group(s) (134A, 134N). A transaction group (134A, 134N) may be a clustering of similar transaction records (136B, 136M). In one embodiment of the invention, a set of transaction records (136B, 136M) may be similar to one another based on one or more transaction detail(s) common or shared amongst the set of transaction records (136B, 136M). In one embodiment of the invention, a transaction record (136B, 136M) may only be assigned to one transaction group (134A, 134N). By way of an example, a transaction group labeled "Personal" may include any and all transaction records with the transaction detail of a particular account identifier (for a specific checking account) as a commonality.

In one embodiment of the invention, the rule table (138) may be any type of hierarchical, relational, and/or object-oriented collection of data. In one embodiment of the invention, the rule table (138) may be stored in non-volatile or volatile memory (e.g., on a hard drive or in random access memory (RAM)). In one embodiment of the invention, the rule table (138) may be stored within another data repository (or database) within the TTS (130). Furthermore, the rule table (138) includes one or more rule table entries (140C, 140P). In one embodiment of the invention, each rule table entry (140C, 140P) corresponds to a rule and subsequently stores a RET (142). In one embodiment of the invention, a RET (142) may be a tuple consisting of two or more attributes necessary for the execution or application of the rule. In one embodiment of the invention, the attributes included in a RET (142) include, but are not limited to: (i) a criteria or set of conditions that triggers the execution or application of the rule; (ii) a set of actions that are to be performed upon meeting the criteria or set of conditions; and (iii) an identifier or description for the table(s) or collection of data to which the rule applies. By way of an example, a RET (142) may include attributes specifying the following: (a) criteria: the transaction includes a transaction detail specifying Starbucks® as the entity involved in the transaction; (b) action: assign the transaction record associated with the transaction to the "Coffee Shops" transaction group; and (c) data: any transaction record (136B, 136M) stored in the transaction repository (132). (Starbucks® is a registered trademark of the Starbucks Corporation.)

Figure 1D:
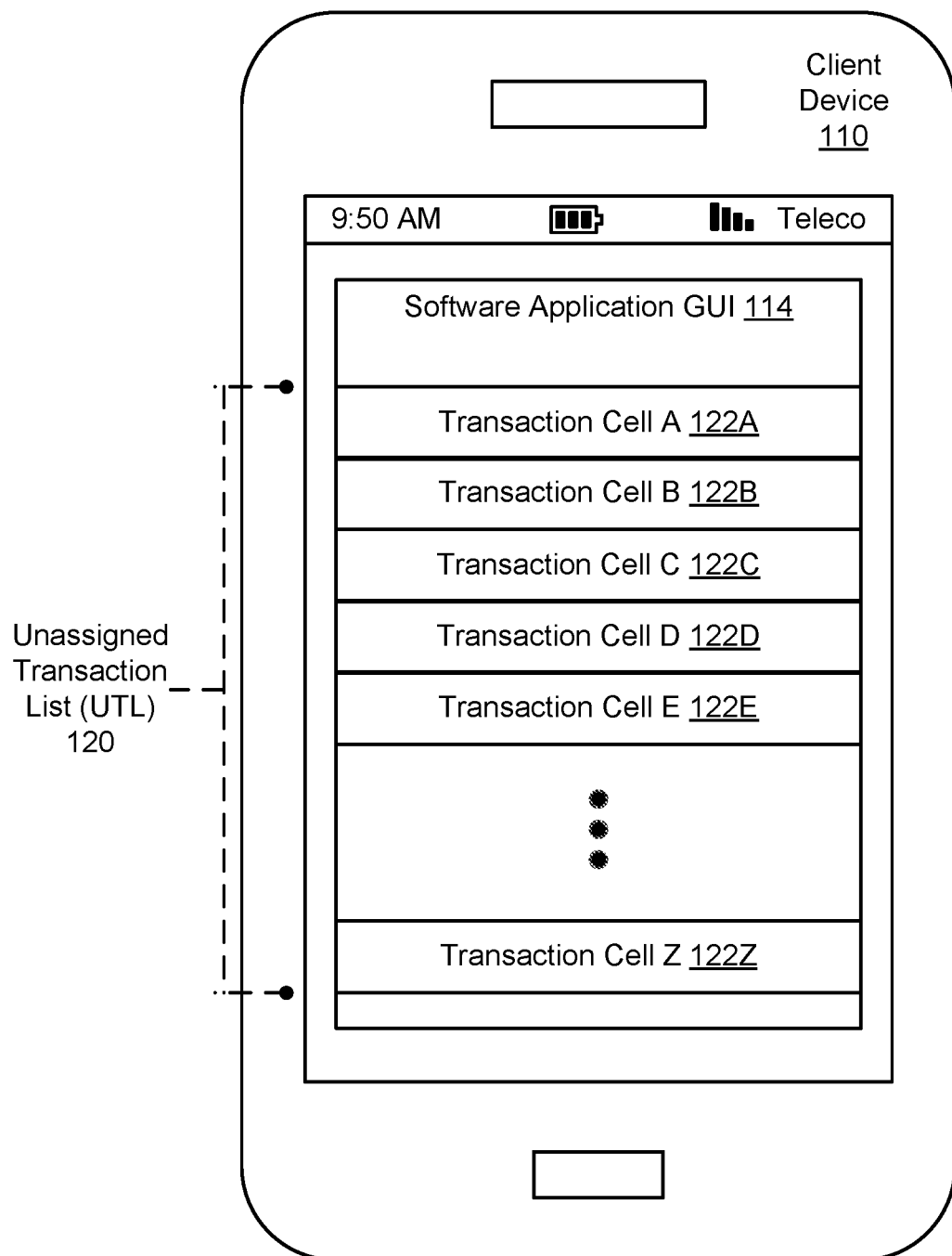
FIG. 1D shows the presentation of an unassigned transaction list on a client device in accordance with one or more embodiments of the invention.

FIG. 1D shows the presentation of an unassigned transaction list on a client device in accordance with one or more embodiments of the invention. As discussed above, a software application GUI (114) may be executing on the underlying hardware of a client device (110). Further, content in the form of graphical elements may be presented to a market user via the software application GUI (114). In one embodiment of the invention, a UTL (120) may be a set of transactions, particular to the market user, that have yet to be assigned to a transaction group. The UTL (120) may therefore be presented to the market user in order to, in conjunction with input from the market user, determine the transaction group(s) to which the set of unassigned transactions is to be assigned. In one embodiment of the invention, a UTL (120) may be presented using a set of transaction cells (122A-122Z). In one embodiment of the invention, a transaction cell (e.g., 122A) may be a graphical element that may be rendered within the software application GUI (114). Each transaction cell (e.g., 122A) corresponds to one unassigned transaction of the set of unassigned transactions forming a UTL (120). In one embodiment of the invention, a transaction cell (e.g., 122A) may include/present one or more transaction details associated with the particular unassigned transaction to which it corresponds. Moreover, as a graphical element, the market user may be able to manipulate or engage a transaction cell (e.g., 122A). In one embodiment of the invention, the manipulation or engagement of a transaction cell (e.g., 122A) may trigger an action including, but not limiting to: (i) the transition of the transaction cell (e.g., 122A) into different states (see e.g., FIG. 2); or (ii) the presentation of other graphical elements.

Figure 2:
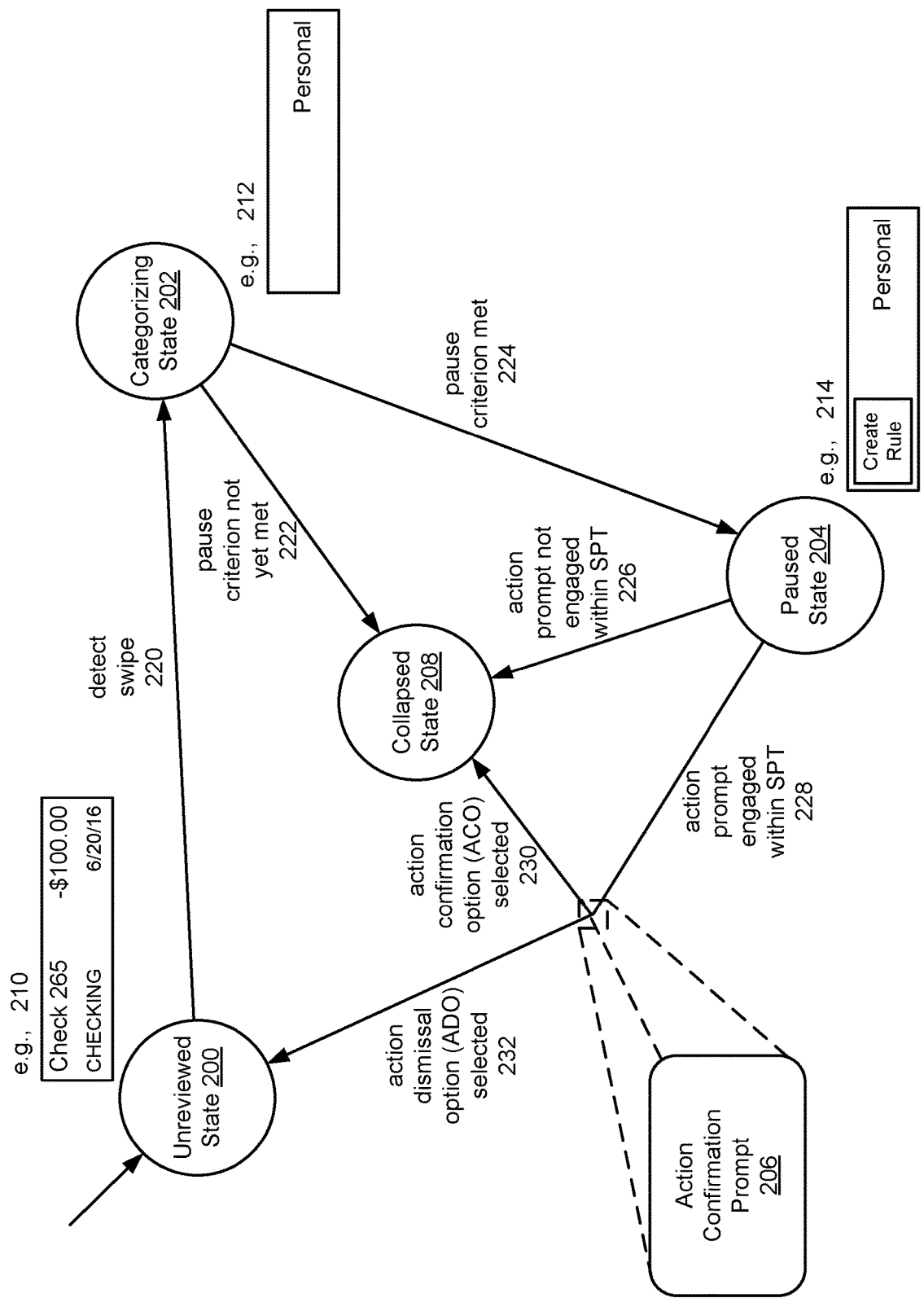
FIG. 2 shows a state diagram describing the states of a transaction cell in accordance with one or more embodiments of the invention.

FIG. 2 shows a state diagram describing the states of a transaction cell in accordance with one or more embodiments of the invention. In one embodiment of the invention, a transaction cell may be presented to a market user through one of four different states: (i) an unreviewed state (200); (ii) a categorizing state (202); (iii) a paused state (204); and (iv) a collapsed state (208). Each of these states and the transitioning conditions connecting them are described below.

In one embodiment of the invention, any given transaction cell may initially be exhibited at an unreviewed state (200). That is, in one embodiment of the invention, when initially rendered on the client device as part of a UTL, a transaction cell appears in the unreviewed state (200) to the market user. In one embodiment of the invention, while in the unreviewed state (200), the transaction cell may provide one or more transaction detail(s) associated with the transaction data, transaction, and/or transaction record to which the transaction cell corresponds. The one or more transaction detail(s) may be arranged in any way within the transaction cell. By way of the example (210) illustrated in FIG. 2, in one embodiment of the invention, a different transaction detail (e.g., a check number, an amount expended during the transaction, an account identifier, or a date the transaction transpired) may be situated at each corner of the transaction cell. In one embodiment of the invention, the one or more transaction detail(s) that is to be provided may be preselected by the TTS. In one embodiment of the invention, the transaction cell may revert back to the unreviewed state (200) from the paused state (204) when an action dismissal option (ADO) provided through an action confirmation prompt (206) is selected (232) by the market user (discussed below).

In one embodiment of the invention, a transaction cell may subsequently transition into a categorizing state (202) from the unreviewed state (200). In one embodiment of the invention, the transition may be triggered by the detection of a swipe gesture (220) (discussed below) over/across the transaction cell. In one embodiment of the invention, the swipe gesture may indicate a transaction group to which the market user wishes the transaction to be assigned. In one embodiment of the invention, while in the categorizing state (202), the one or more transaction detail(s) previously provided by the unreviewed state (200) is hidden, and a label or transaction group identifier (e.g., "Personal") associated with the transaction group to which the transaction may be assigned is alternatively provided within the transaction cell, as depicted in the example (212) in FIG. 2. In one embodiment of the invention, a transaction group identifier may be any sequence of letters, numbers, symbols, and/or any combination thereof, and of any length, which uniquely identifies a transaction group. The label/transaction group identifier may appear near the left edge, or alternatively, near the right edge of the transaction cell depending on the observed directionality of the swipe gesture. For example, if the directionality of the swipe gesture pointed to the left edge of the screen, the label/transaction group identifier would appear near the left edge of the transaction cell. Conversely, if the directionality of the swipe gesture pointed to the right edge of the screen, the label/transaction group identifier would appear near the right edge of the transaction cell. By way of another example, if the directionality of the swipe gesture pointed to one edge of the screen, the label/transaction group identifier may appear near the opposing edge of the transaction cell. Other properties associated with the transaction cell (e.g., color, line thickness, font size, etc.) may change between different states without departing from the scope of the invention.

In one embodiment of the invention, a transaction cell may transition into a paused state (204) from the categorizing state (202). In one embodiment of the invention, the transition may be triggered by a pause criterion being met (224) (discussed below). The pause criterion may be based on or associated with a transaction group. For example, a pause criterion may require the categorizing (or assignment) of a predetermined number of transactions (listed in the UTL), each with at least one common transaction detail, to a particular transaction group. In one embodiment of the invention, while in the paused state (204), an action prompt in the form of an additional graphical element (e.g., a push button, a toggle button, a slider, etc.) to which the market user may engage may be appended to or replace the existing content(s) within the transaction cell. In one embodiment of the invention, the action prompt may be visible to the market user temporarily. As such, the market user may only have a limited amount of time, specified by a swipe pause timer (SPT), within which the action prompt is visible and may be engaged by the market user. Further, in one embodiment of the invention, when engaged by the market user, the action prompt may perform one or more action(s). In the example transaction cell (214) provided in FIG. 2, a rule-creation button appears within the transaction cell, which when engaged by the market user, may create a rule that applies to at least the transaction associated with the transaction cell. In one embodiment of the invention, the action prompt may be rendered near the edge of the transaction cell opposite the edge to which the label associated with a transaction group is near. In another embodiment of the invention, the label of the transaction group may be rearranged or removed in order to accommodate the rendering of the action prompt within the transaction cell.

In one embodiment of the invention, while the transaction cell is maintained in the paused state (204), the market user may engage the action prompt provided within the time allotted by the SPT (228). In such an embodiment, an action confirmation prompt (206) in the form of additional graphical element(s) (e.g., a dialog box, one or more push button(s), etc.) may be rendered on the GUI and thereby, presented to the market user. In one embodiment of the invention, the action confirmation prompt (206) may include one or more detailed option(s) through which the action(s) associated with the action prompt may be tasked or performed. In one embodiment of the invention, the detailed options provided include, but are not limited to, an ADO and/or one or more action confirmation option(s) (ACO). In one embodiment of the invention, as mentioned above, selection of the ADO (232) may transition the transaction cell back to the unreviewed state (200). Meanwhile, selection of an ACO (230) may transition the transaction cell to the collapsed state (208) (discussed below). The action confirmation prompt (206) is described in further detail below with respect to FIG. 3D.

In one embodiment of the invention, a transaction cell may transition into the collapsed state (208) from the categorizing state (202) or the paused state (204). In one embodiment of the invention, the transition of the transaction cell from the categorizing state (202) to the collapsed state (208) may be triggered by the pause criterion (discussed above) not being met yet (222). With regards to the transition of the transaction cell from the paused state (204) to the collapsed state (208) (without the introduction of the action confirmation prompt), in one embodiment of the invention, the transition may be triggered by the inaction of the market user to engage the provided action prompt while the SPT (226) is pending. Further, in one embodiment of the invention, when the transaction cell is in the paused state (204), and the action confirmation prompt has been introduced due to engagement of an action prompt (228), the transaction cell may transition into the collapsed state (208) subsequent to the selection of an ACO (230) and the execution of one or more action(s) (e.g., rule creation, etc.) pertinent to performing the ACO. In one embodiment of the invention, upon reaching the collapsed state (208), the transaction cell may be removed from the UTL. Subsequently, the transaction cell may no longer be visible to and/or be manipulated/engaged by the market user.

Figure 3A:
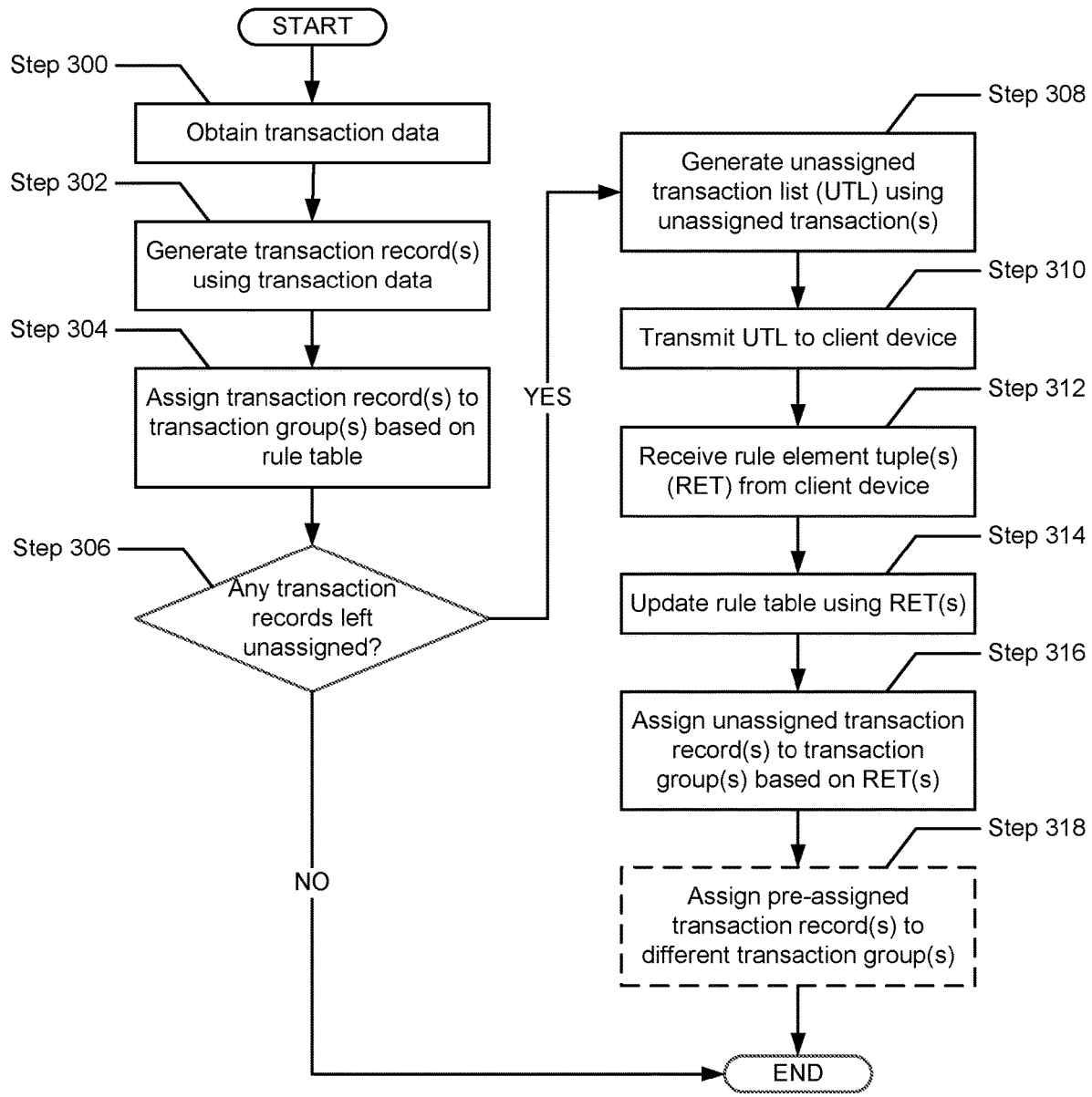
FIG. 3A shows a flowchart describing a method for transaction rule creation in accordance with one or more embodiments of the invention.
Figure 3B:
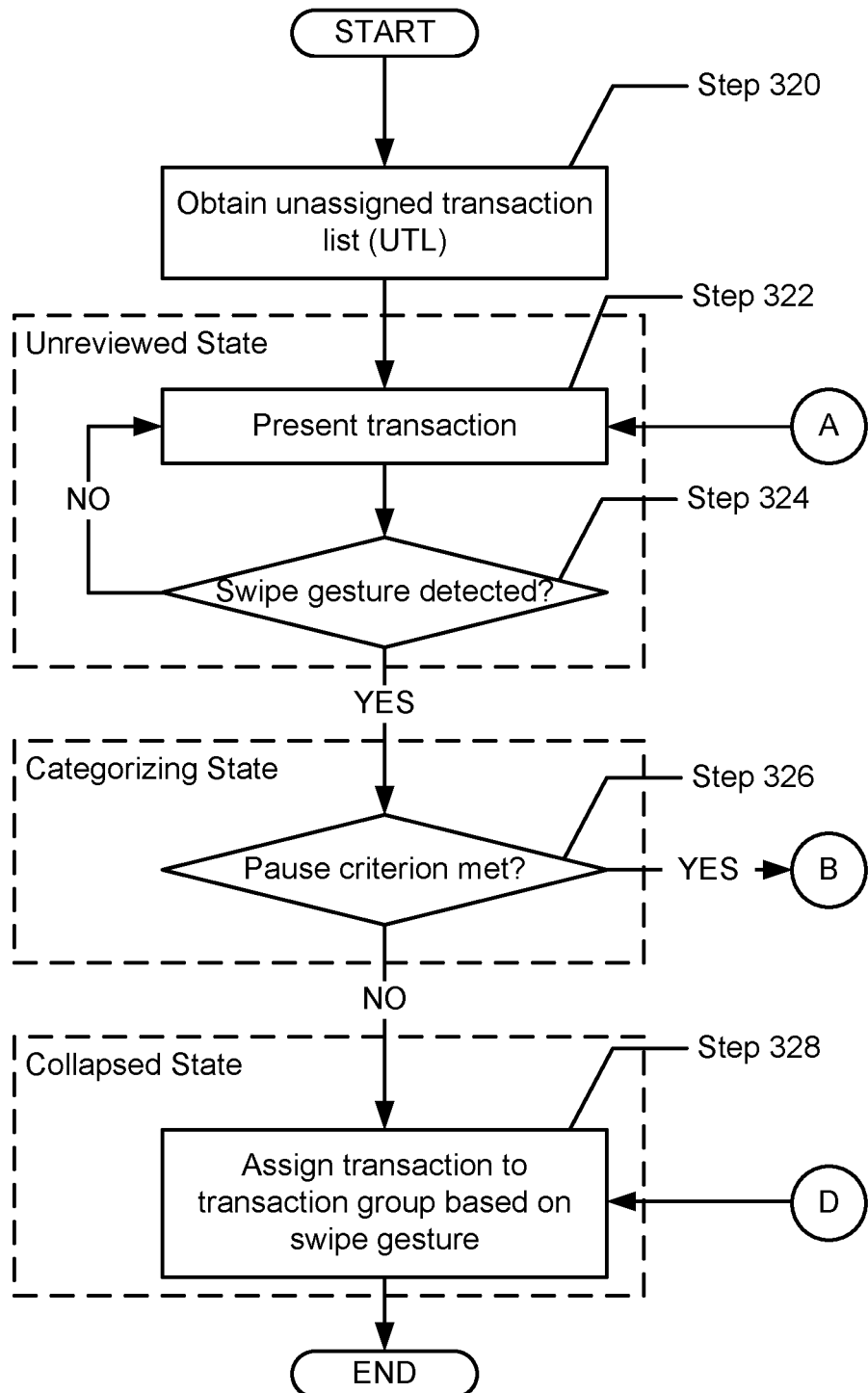
FIG. 3B, FIG. 3C, and FIG. 3D show flowcharts describing a method for surfacing action options in accordance with one or more embodiments of the invention.
Figure 3C:
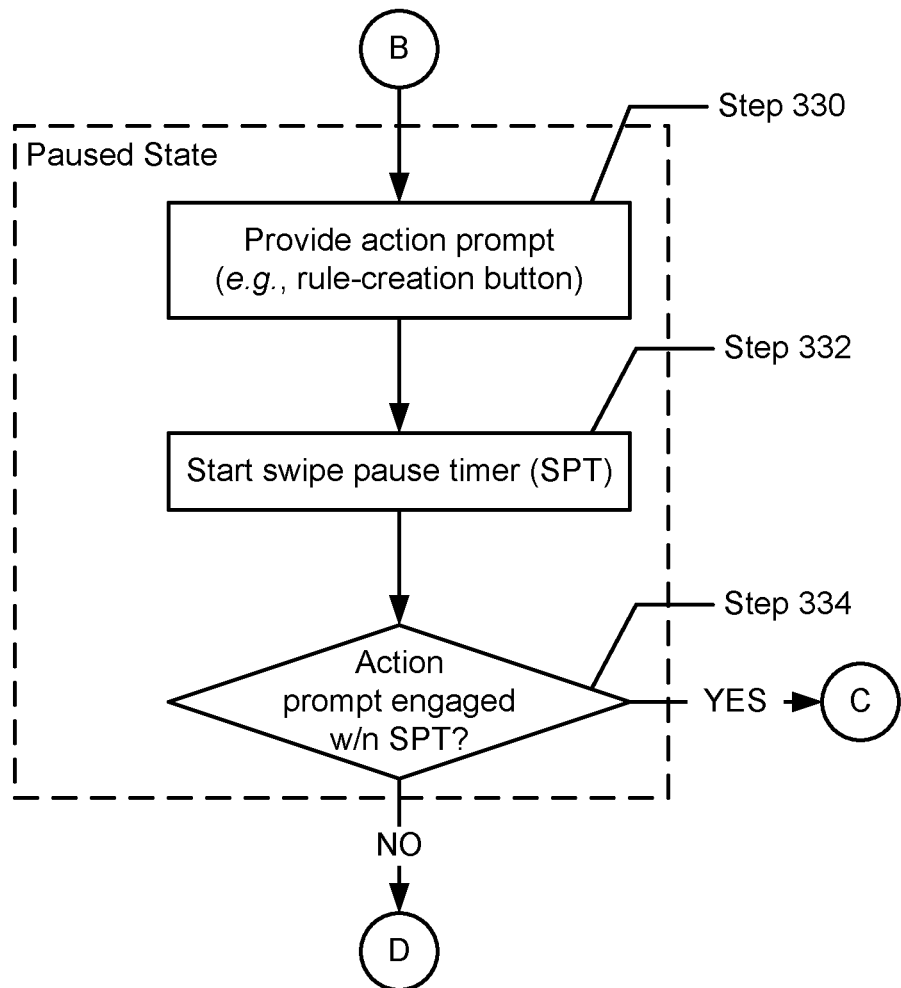
Figure 3D:
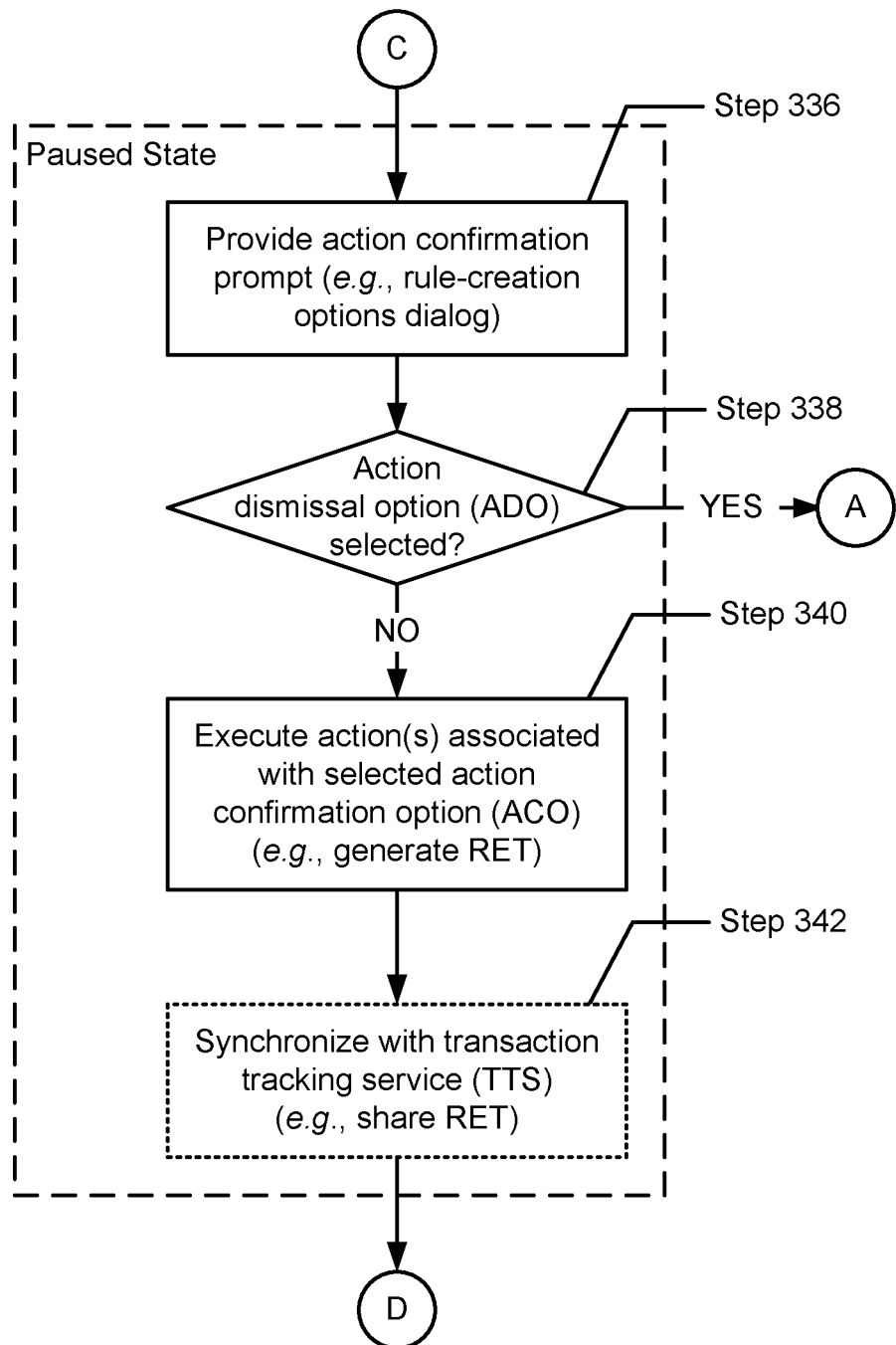

FIGS. 3A, 3B, and 3D show flowcharts in accordance with one or more embodiments of the invention. While the various steps in these flowcharts are presented and described sequentially, one of ordinary skill in the art will appreciate that some or all steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

FIG. 3A shows a flowchart describing a method for transaction rule creation in accordance with one or more embodiments of the invention. In Step 300, transaction data is obtained. In one embodiment of the invention, transaction data may be obtained from one or more third-party system(s). As discussed above, in one embodiment of the invention, a third-party system may be a provider of financial services, or a financial institution. The third-party system(s) may provide the transaction data in response to a request for transaction data submitted by the TTS. In one embodiment of the invention, the obtained transaction data may be associated with a particular market user.

In Step 302, one or more transaction record(s) are generated using the transaction data (obtained in Step 300). In one embodiment of the invention, the obtained transaction data may represent one or more different transaction(s). As such, a separate transaction record may be generated for each transaction. In one embodiment of the invention, a transaction record may include transaction details that include, but are not limited to, a transaction amount, a transaction date and/or time, an entity (e.g., vendor, customer, etc.) involved in the transaction, a transaction description and/or summary, an account identifier for a bank or credit card account from/to which a transaction amount is debited or credited, etc.

In Step 304, the one or more transaction record(s) (generated in Step 302) is assigned to one or more transaction group(s). In one embodiment of the invention, assignments may be determined based on the one or more rule table entries included in the rule table (see e.g., FIG. 1C). As discussed above, in one embodiment of the invention, each rule table entry includes a RET that discloses the attributes necessary for the execution or application of an existing rule. Further, the attributes included in a RET may include, but are not limited to: (i) a criteria or set of conditions that triggers the execution or application of the rule; (ii) a set of actions that are to be performed upon meeting the criteria or set of conditions; and (iii) an identifier or description for the table(s) or collection of data to which the rule applies.

In one embodiment of the invention, each of the one or more generated transaction record(s) may subsequently be compared with the criteria or set of conditions corresponding to each rule table entry in the rule table. More specifically, in one embodiment of the invention, the criteria or set of conditions within a RET may specify a transaction detail to which a transaction detail within a transaction record must match in order for the corresponding rule to apply to the transaction record. In reference to the example introduced above, a rule table entry may, for example, include the criterion of a transaction detail specifying Starbucks® as the entity involved in the transaction. As such, when comparing each transaction record to this particular rule table entry, the transaction details for each transaction record (generated in Step 302) are evaluated to determine a subset of transaction records that includes Starbucks® as a transaction detail. In one embodiment of the invention, a subset of the transaction records may include none, one or more, or all of the generated transaction records. The set of actions associated with the rule table entry may then be applied to the subset of transaction records that meet the aforementioned Starbucks® criterion. Further to the above example, the action associated with the rule table entry may specify the assignment of the subset of transaction records to the "Coffee Shops" transaction group.

In Step 306, a determination is made as to whether any of the one or more generated transaction record(s) remains unassigned to a transaction group. In one embodiment of the invention, a transaction record may remain unassigned when the transaction record includes no transaction details that match the criteria or set of conditions for any of the rules in the rule table. If it is determined that at least one transaction record remains unassigned to a transaction group, the process proceeds to Step 308. On the other hand, if it is determined that no transaction records remain unassigned (e.g., all transaction records, generated in Step 302, were assigned to a transaction group based on one or more transaction detail(s) matching the criteria or set of conditions for one or rule table entries), then the process ends.

In Step 308, in determining that at least one transaction record remains unassigned to a transaction group, a UTL is generated using the transaction data associated with the remaining transaction record(s). In Step 310, the generated UTL is subsequently transmitted to the client device associated with the market user.

In Step 312, after transmitting the UTL to the client device for review by the market user, one or more RET is received from the client device. In one embodiment of the invention, each received RET may correspond to a transaction (or transaction record) in the UTL. In another embodiment of the invention, each received RET may correspond to more than one transaction (or transaction record) in the UTL. In the latter embodiment, multiple transactions may exist within the UTL that have one or more overlapping transaction detail(s) that may be used as criteria or a set of conditions for an RET.

In Step 314, the rule table is updated using the one or more RET (received in Step 312). As mentioned above, a RET may include attributes that include, but are not limited to: (i) a criteria or set of conditions that triggers the execution or application of a rule; (ii) a set of actions that are to be performed upon meeting the criteria or set of conditions; and (iii) an identifier or description for the table(s) or collection of data to which the rule applies. As such, in one embodiment of the invention, a received RET may include criteria or a set of conditions matching the criteria or set of conditions corresponding to an existing rule table entry in the rule table. In such an embodiment, the set of actions associated with the received RET may be appended to or replace the set of actions listed in the existing rule table entry. In another embodiment of the invention, a received RET may include criteria or a set of conditions that do not match any criteria or sets of conditions corresponding to any of the existing rule table entries. In this embodiment of the invention, a new rule table entry may be generated to include the attributes contained in the received RET.

In Step 316, the unassigned transaction record(s) (identified in Step 306) is assigned to transaction group(s) based on the received RET. In one embodiment of the invention, a received RET may include an action to assign one or more unassigned transaction record(s) with a particular transaction detail to a particular transaction group. Further, in one embodiment of the invention, one or more pre-assigned transaction record(s) may be re-assigned to other transaction group(s) based on the updated rule table and/or received RET. In such an embodiment, an update to an existing rule or a new rule may re-assign one or more transaction record(s) from an original transaction group to a new transaction group, and/or undo an assignment of a transaction record to any transaction group completely. In this case, Steps 306 through 312 may be repeated until all transaction records are assigned to a transaction group within the transaction repository.

FIG. 3B, FIG. 3C, and FIG. 3D show flowcharts describing a method for surfacing or providing action options in accordance with one or more embodiments of the invention. In the following flowcharts, the steps towards surfacing action options are presented via the solid-lined shapes, whereas the state of a transaction cell during subsets of the following steps are presented via the dashed-lined boxes. For example, turning to FIG. 3B, Steps 322 and 324 are enclosed by an "unreviewed state" labeled dashed-lined box. That is, in one embodiment of the invention, following the state diagram disclosed in FIG. 2, a given transaction cell is rendered at an "unreviewed state" while the process remains at Steps 322 and/or 324. Furthermore, when the process proceeds to subsequent steps, the given transaction cell may transition into other states, such as the "categorizing state", which is synonymous with Step 326, and so forth.

Turning to the top of FIG. 3B, in Step 320, a UTL is obtained. In one embodiment of the invention, the UTL may be transmitted or pushed towards a client device by the TTS. In one embodiment of the invention, the TTE (see e.g., FIG. 1B) of the software application executing on the client device may receive the UTL. In one embodiment of the invention, the UTL includes transaction data corresponding to one or more unassigned transaction record(s) or transaction(s).

In Step 322, the transaction(s) outlined in the UTL is presented. In one embodiment of the invention, the trans-action(s) may be presented via the GUI of the software application (executing on the client device) as shown in or similar to the manner illustrated in FIG. 1D. In another embodiment of the invention, the presentation of the transaction(s) via the GUI may be rendered differently. In one embodiment of the invention, presentation of the transaction(s) may include generation of transaction cell(s) (e.g., graphical elements) for the transaction(s). Each transaction cell may subsequently provide one or more transaction detail(s) associated with a transaction, thereby providing substantive information regarding the transaction to the market user.

In Step 324, a determination is made as to whether a swipe gesture over a given transaction cell is detected. In one embodiment of the invention, a swipe gesture may encompass the sliding of an object (e.g., a stylus pen, a digit/finger of the market user's hand, etc.) across the touchscreen of the client device. A touchscreen may be an input device layered over the display of the client device, which includes functionality to allow the market user to interact with the client device by touching areas of the screen. The touchscreen may include further functionality to ascertain metadata pertaining to a detected gesture. The aforementioned metadata may include, but is not limited to, a directionality of the gesture, a speed the gesture was performed, the areas of the screen affected by the gesture, etc. In one embodiment of the invention, determining whether the swipe gesture affects a given transaction cell includes determining whether the area of the screen covered by the swipe gesture predominantly overlaps the area occupied by the transaction cell on the GUI. Subsequently, if it is determined that a swipe gesture over a given transaction cell has been detected, then the process proceeds to Step 326. On the other hand, the process remains or reverts to Step 322 if a swipe gesture has yet to be detected, or to which transaction cell a detected swipe gesture corresponded could not be resolved.

In Step 326, in determining that a swipe gesture over a given transaction cell was detected, another determination is made as to whether the pause criterion is met. In one embodiment of the invention, the pause criterion may be a condition for triggering the transition of the given transaction cell to the "paused state." In one embodiment of the invention, the condition for triggering the transition may include, for example, the categorizing (or assignment) of a predetermined number of transactions (listed in the UTL), each with at least one common transaction detail, to a particular transaction group. In one embodiment of the invention, the predetermined number of transactions may be a default number set by the TTS. In another embodiment of the invention, the predetermined number of transactions may be a value set due to personal preferences associated with the market user. If it is determined that the pause criterion has been met, the process proceeds to Step 330 (see e.g., FIG. 3C). On the other hand, if it is determined that the pause criterion has not been met, the process proceeds to Step 328.

In Step 328, in determining that: (i) the pause criterion has not been met (discussed above with respect to Step 326); (ii) the action prompt has not been engaged within the allotted time of the SPT (discussed below with respect to Step 334); or (iii) synchronizing with the TTS (discussed below with respect to Step 342), the transaction (or transaction record) associated with the given transaction cell is assigned to a transaction group based on the swipe gesture. In one embodiment of the invention, metadata (e.g., directionality) associated with the swipe gesture may be used to determine to which transaction group the transaction is to be assigned.

For example, a swipe gesture characterized with a directionality towards the left edge of the screen may oblige assignment of the given transaction to a first transaction group, whereas a swipe characterized with a directionality towards the right edge of the screen may oblige assignment of the given transaction to a second transaction group. In one embodiment of the invention, the mapping of which transaction group corresponds to an aspect (e.g., directionality) of the swipe gesture may be set by the TTS. In another embodiment of the invention, the aforementioned mapping may be set by the market user in order to coincide with personal preferences. Further, in assigning the given transaction (or transaction record) to a particular transaction group, a counter employed for enumerating the set of transactions (of the UTL) assigned to that particular transaction group is incremented. In one embodiment of the invention, the values specified in these counters, for each of the transaction groups, may be monitored and/or configured to trigger transition of the transaction cell to the "paused state" (as discussed above with reference to Step 326) when a value in a counter reaches or exceeds a predetermined number.

Turning to FIG. 3C, in Step 330, in determining that the pause criterion has been met (see e.g., discussion pertaining to Step 326 above), an action prompt is surfaced/provided. In one embodiment of the invention, an action prompt may be a graphical element (e.g., a push button, a list box, a pop-up menu, etc.), which when manipulated or engaged by the market user, performs one or more action(s) entailing at least the transaction (or transaction record) associated with the given transaction cell. In one embodiment of the invention, the action prompt may be a rule-creation button rendered within the given transaction cell. In such an embodiment, the rule-creation button may further be rendered at the left edge, or alternatively, at the right edge of the given transaction cell depending on the ascertained directionality of the swipe gesture. In the aforementioned rule-creation button embodiment of the invention, the action(s) performed through engagement of the action prompt may include the creation of a rule (discussed below). In other embodiments of the invention, the action(s) performed through engagement of the action prompt may include, for example, the surfacing/providing other content, such as scanned or digital items associated with (or relating to) the transaction. Examples of the content (e.g., scanned/digital items) provided may include, but are not limited to, a receipt, an outgoing invoice, a check, a bill of sale, an insurance claim, or any other available document/item/content associated with the given transaction (or transaction record).

In Step 332, the SPT for the given transaction cell is started. In one embodiment of the invention, the SPT may be a countdown from a predetermined time set point, within which the action prompt and subsequent action options (discussed below) are made available to the market user. Hence, in one embodiment of the invention, when the SPT elapses (i.e., the SPT is no longer pending), the given transaction cell transitions into another state (e.g., the "collapsed state"), at least undoing or removing the action prompt surfaced/provided in Step 330. Thus, in one embodiment of the invention, the market user may have a limited time for which to manipulate or engage the action prompt. In one embodiment of the invention, the predetermined time set point, representing the SPT, may be two seconds. The predetermined time set point may include other time intervals without departing from the scope of the invention.

In Step 334, yet another determination is made as to whether the action prompt (e.g., the rule-creation button) has been engaged within the allotted time of the SPT. In one embodiment of the invention, engagement of the action prompt may include, but is not limited to, a pressing or pushing of a button, a clicking of an icon, an entering of text and/or numbers in a text field, a selecting of a radio button or an action option, a toggling of a toggle button, etc., by the market user. If it is determined that the action prompt has been engaged within the allotted time of the SPT, the process proceeds to Step 336 (see e.g., FIG. 3D). On the other hand, if it is determined that no engagement, by the market user, of the action prompt has occurred within the allotted time of the SPT, the process proceeds to Step 328 (see e.g., FIG. 3B).

Turning to FIG. 3D, in Step 336, in determining that the action prompt has been engaged within the allotted time of the SPT (see e.g., Step 334 in FIG. 3C), an action confirmation prompt is surfaced/provided. In one embodiment of the invention, the action confirmation prompt may be a graphical element (e.g., a push button, a list box, a pop-up menu, etc.) that specifies one or more detailed option(s), aligned with the action(s) of the action prompt, that the market user may pursue. In one embodiment of the invention, the action confirmation prompt may take the form of a rule-creation options dialog. In such an embodiment, the rule-creation options dialog may be rendered over any existing graphical elements (e.g., the transaction cells, the action prompt, etc.) in the GUI.

In one embodiment of the invention, the action confirmation prompt may include an action dismissal option (ADO). In the event the market user had not intended to engage the action prompt (e.g., the action prompt had been accidentally engaged), the ADO provides the market user with a route to cancel/dismiss the action(s) associated with the action prompt process. In one embodiment of the invention, engagement of the ADO may undo the steps subsequent to the detection of the swipe gesture (see e.g., Step 324 in FIG. 3B) that led up to and/or include Step 336. With regard to that which is presented to the market user via the GUI, in one embodiment of the invention, the action confirmation prompt and the action prompt may disappear (i.e., be removed), and the given transaction cell may revert back to its "unreviewed state".

In one embodiment of the invention, the action confirmation prompt may additionally, or alternatively, include one or more action confirmation option(s) (ACO). In one embodiment of the invention, the one or more ACO(s) provided is subject to the action(s) made available through the action prompt. Subsequently, in one embodiment of the invention, when engaged by the market user, an ACO may execute the action(s) associated with the action prompt in a particular manner. For example, in the rule-creation button embodiment mentioned above, a rule-creation options dialog may be presented that includes two ACOs: (i) a first ACO, which when engaged/selected, creates a rule that affects only existing transaction(s) (including the transaction associated with the given transaction cell) that includes a specified common transaction detail; and (ii) a second ACO, which when engaged/selected, creates a rule that affects existing transaction(s) and any future transaction(s) that include the specified common transaction detail.

In Step 338, a determination is made as to whether the ADO has been engaged or selected. If it is determined that the ADO has been engaged/selected, the process proceeds to Step 322 (see e.g., FIG. 3B). On the other hand, if it is determined that the ADO has not been engaged/selected, or alternatively, one of the one or more ACO(s) has been engaged/selected, the process proceeds to Step 340.

In Step 340, in determining that an ACO has been engaged/selected, the action(s) specified by the ACO is executed. In reference to the rule-creation button embodiment of the invention, a rule may be created that applies to existing transactions (including the transaction associated with the given transaction cell) and/or future transactions that include a specified common transaction detail. In such an embodiment, the creation of the rule may encompass the generation of a RET. As discussed above, an RET may include, but is not limited to: (i) a criteria or set of conditions that triggers the execution or application of the rule; (ii) a set of actions that are to be performed upon meeting the criteria or set of conditions; and (iii) an identifier or description for the table(s) or collection of data to which the rule applies. With respect to the aforementioned embodiment, the RET may include, for example: (a) as the criteria, the specified common transaction detail; (b) as the action, the assignment of transaction(s) that meet the criteria into a specified transaction group associated with a given transaction group identifier; and (c) as the data affected, any transactions (or transaction record(s)) stored in the transaction repository on the TTS that corresponds to the market user.

In one or more embodiments of the invention, such as the surfacing of other content (e.g., scanned/digital items) embodiment mentioned above, the action(s) executed may entail the following: (i) the accessing of one or more data repositories, on the TTS or on a third-party system, each of which may store one or more type(s) of content (e.g., scanned/digital items (e.g., a receipt, an outgoing invoice, etc.)); (ii) the performing of a search on the set of items in the one or more data repositories for one or more item(s) that includes information (e.g., a purchase amount, a vendor, a financial institution account used, etc.) that matches a transaction detail of the transaction associated with the given transaction cell; (iii) if the search of (ii) is successful, the obtaining of the one or more item(s)/content identified in the search; and (iv) the presenting of the one or more item(s)/content to the market user via the GUI of the software application executing on the client device.

In Step 342, synchronization with the TTS may be performed. Synchronization may optionally be performed depending on the action(s) executed in Step 340. For example, in reference to the rule-creation embodiment, synchronization with the TTS is required as additional steps must be performed by the TTS in order to complete the rule-creation process. In such an embodiment of the invention, subsequent to receiving the RET (see e.g., Step 312 in FIG. 3A), the TTS performs Steps 314, 316, and 318. In other embodiments of the invention, synchronization with the TTS may not be required or necessary.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

FIGS. 5A, 5B, 5C, 5D, 5E, 5F, 5G, 5H, 5I, 5J, 5K, and 5L show various aspects pertaining to an example in accordance with one or more embodiments of the invention. The following example is for explanatory purposes only and not intended to limit the scope of the invention.

Figure 5A:
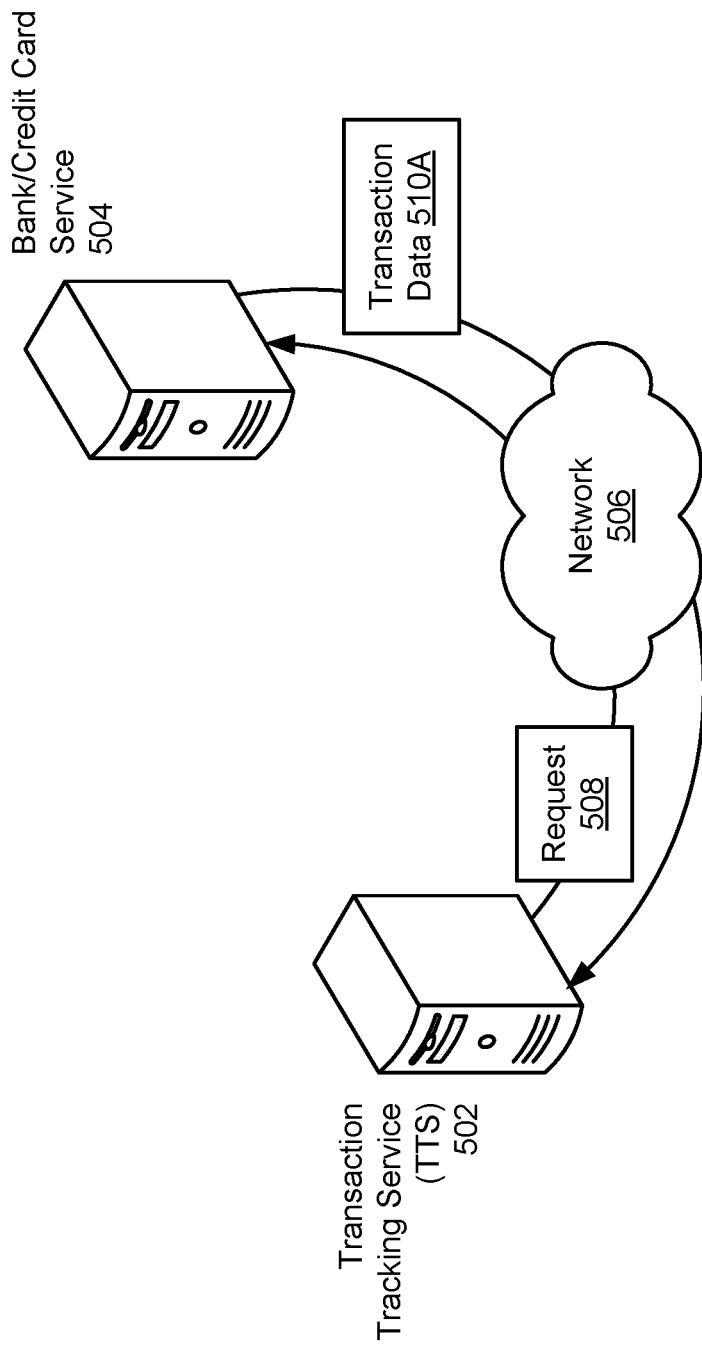
FIGS. 5A, 5B, 5C, 5D, 5E, 5F, 5G, 5H, 5I, 5J, 5K, and 5L show various aspects pertaining to an example in accordance with one or more embodiments of the invention.

Turning to FIG. 5A, in response to a market user refreshing a GUI to a transaction tracking software application executing on their client device, the TTS (502) generates and submits a request (508) for transaction data (510A) associated with the market user. The request (508) traverses the network (506) and arrives at a bank/credit card service (504). In one embodiment of the invention, the request (508) may include identification and/or account information uniquely associated with the market user in order for the bank/credit card service (504) to identify the appropriate transaction data (510A). Subsequent to identifying the appropriate transaction data (510A), the bank/credit card service (504) transmits the transaction data (510A) back, through the network (506), to the TTS (502).

Figure 5B:
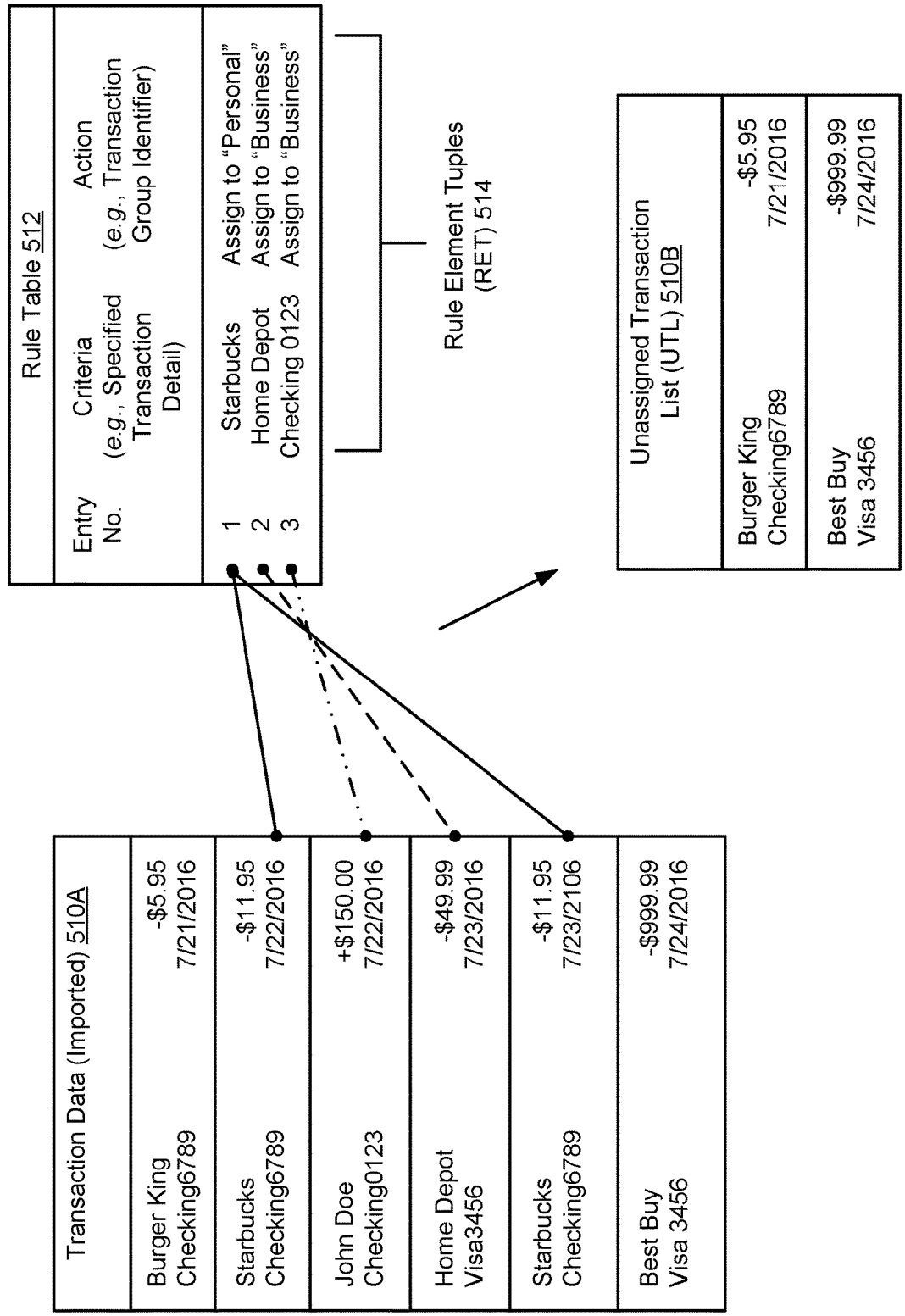

Turning to FIG. 5B, the transaction data (510A) obtained by the TTS includes 6 recently made transactions between the market user and various other entities (e.g., Burger King, Starbucks, John Doe, Home Depot, and Best Buy). Upon receipt of the transaction data (510A), a transaction record is generated for each transaction. The TTS then compares the 6 transactions to criteria outlined in a locally-stored rule table (512) to identify and apply any rule(s). The product of the comparison reveals that: (a) two transactions in the transaction data (510A) include Starbucks as a transaction detail, which match the criteria required for applying the rule corresponding to Entry No. 1 in the rule table (512); (b) one transaction in the transaction data (510A) includes Home Depot as a transaction detail, which matches the criteria required for applying the rule corresponding to Entry No. 2 in the rule table (512); and (c) one transaction in the transaction data (510A) includes Checking0123 as a transaction detail, which matches the criteria required for applying the rule corresponding to Entry No. 3 in the rule table (512). Pursuant to these matches and the performance of the action associated with each respective rule: (a) the transaction records for the two Starbucks transactions are assigned to a transaction group associated with the transaction group identifier "Personal"; (b) the transaction record for the one Home Depot transaction is assigned to another transaction group associated with the transaction group identifier "Business"; and (c) the transaction record for the one Checking0123 transaction is assigned to the transaction group associated with the transaction group identifier "Business". The rule table (512) thus specifies that any transactions that include Starbucks as a transaction detail are to be clustered as personal-related credits or debits. Further, any transactions that include either Home Depot or Checking0123 as a transaction detail are to be clustered as business-related credits or debits.

In one embodiment of the invention, each entry in the rule table (512) includes a RET (514). In this example, each RET (514) corresponds to a rule, and includes criteria that must be met for the rule to apply, and an action that is performed upon the criteria being met. After assignment of those transactions that met criteria within the rule table (512), the TTS observes that two transactions remain, which have yet to be placed within a transaction group. The TTS subsequently generates a UTL (510B) that includes the transaction data (510A) of those two remaining, unassigned transactions.

Figure 5C:
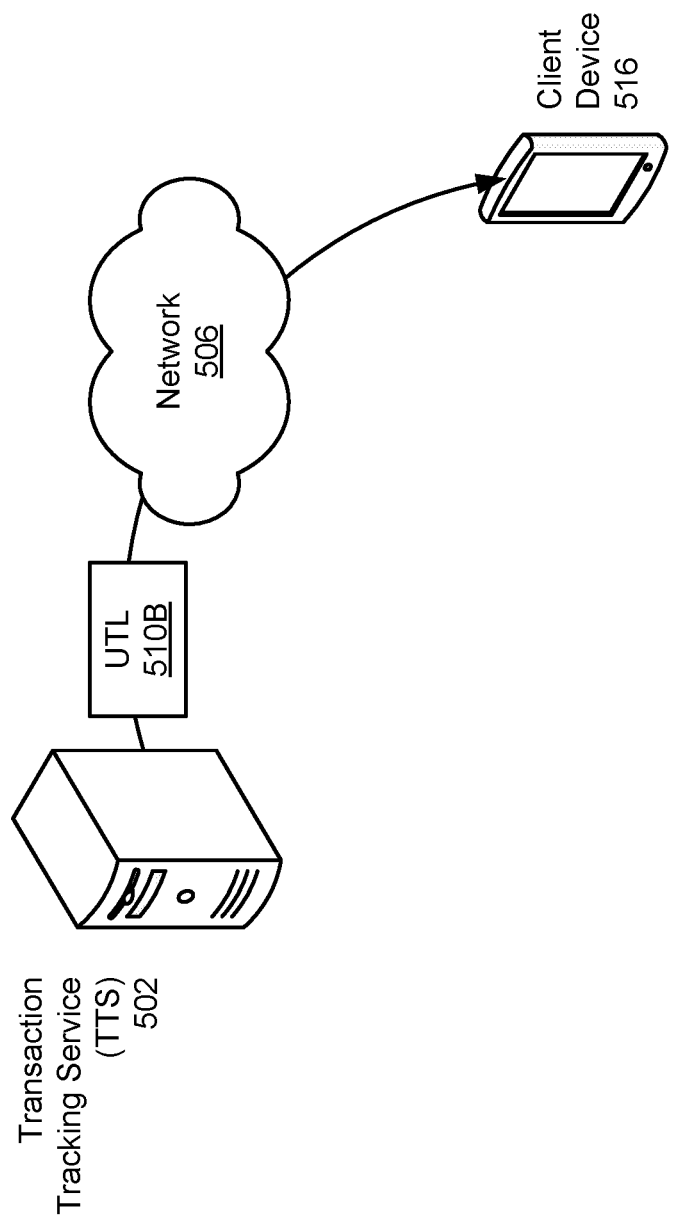
Figure 5D:
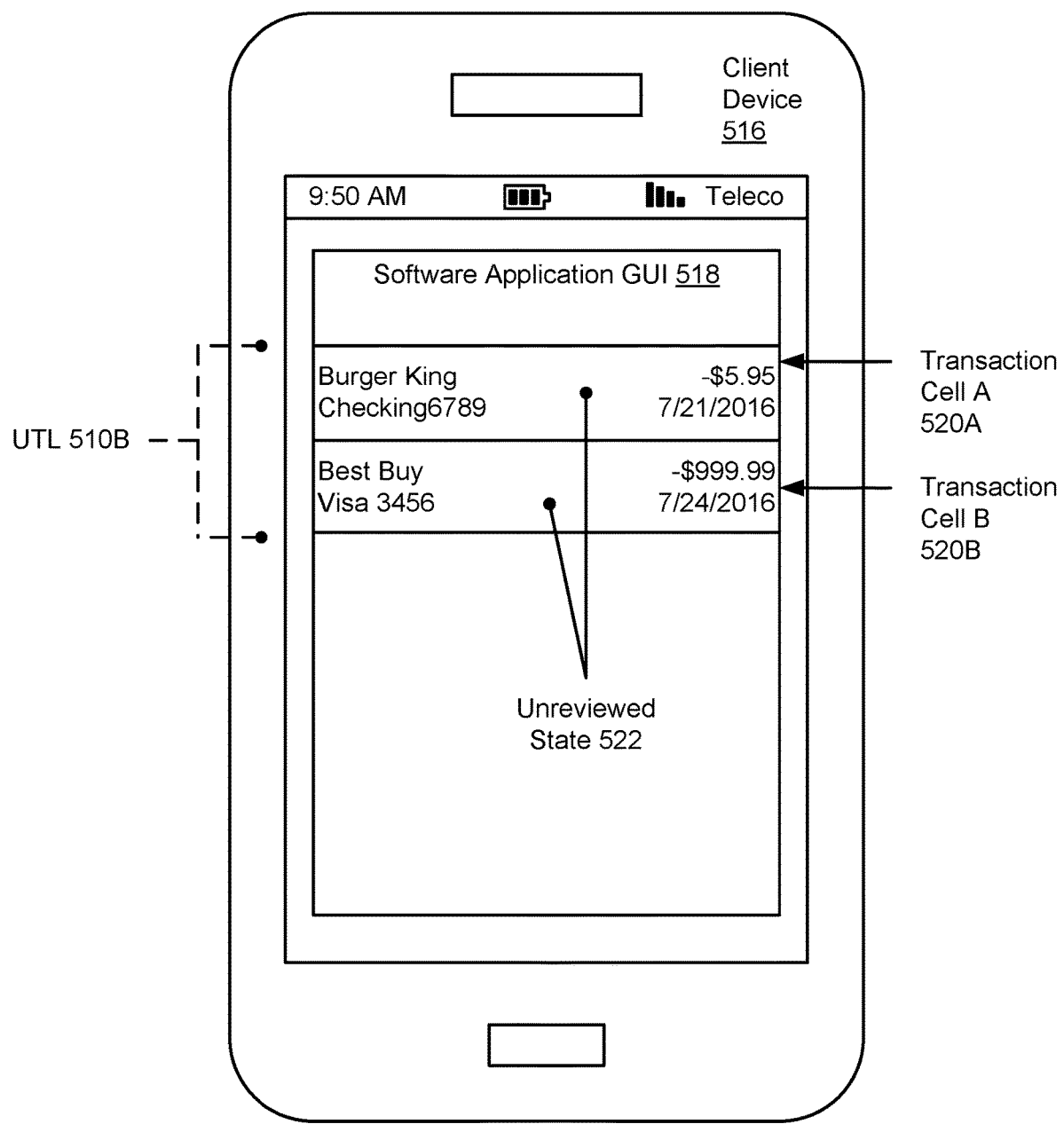

Turning to FIG. 5C, after generating the UTL (510B), the TTS (502) transmits or pushes the UTL (510B), through the network (506), towards the client device (516) of the market user. Turning to FIG. 5D, the client device (516) receives the UTL (510B) via the TTE (not shown) and proceeds to display the UTL (510B) to the market user. The UTL (510B) is subsequently rendered on the software application GUI (518) as two transaction cells (520A, 520B) representing the two unassigned transactions. Further, the transaction cells (520A, 520B) are presented to the market user at their initial "unreviewed state" (522). In one embodiment of the invention, while in the "unreviewed state" (522), each transaction cell (520A, 520B) provides one or more transaction detail(s) included in the transaction data corresponding to the respective transaction.

Figure 5E:
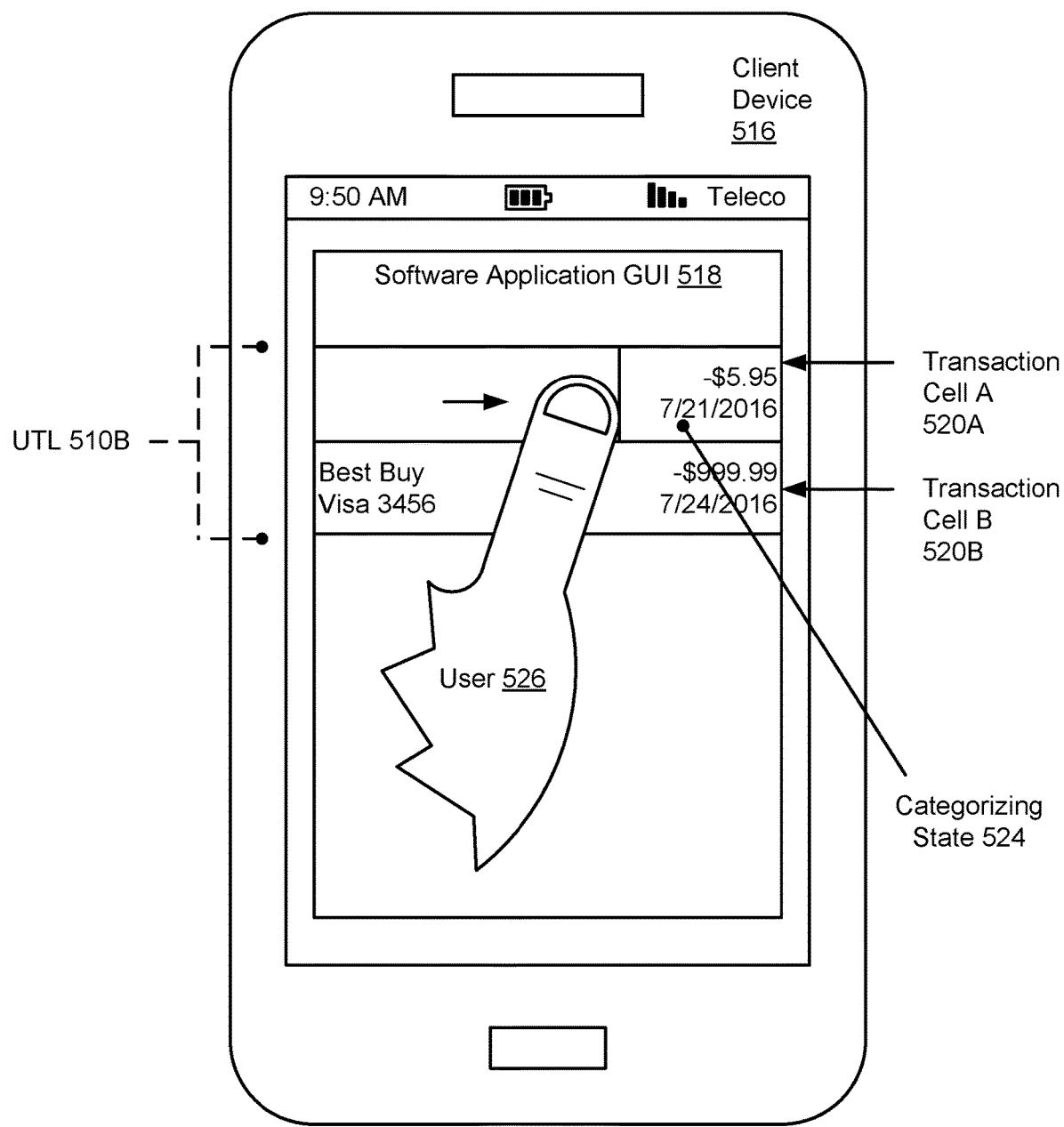

Turning to FIG. 5E, in reviewing the UTL (510B), the market user (526) decides to engage with one of the transaction cells. In engaging with the Burger King transaction cell (520A), the market user (526) swipes the transaction cell (520A) in the direction of the right edge of the screen. Further, in detecting the swipe gesture, the Burger King transaction cell (520A) transitions into the "categorizing state" (524). While in the "categorizing state" (524), the transaction cell (520A) removes the previous content (e.g., one or more transaction detail(s)) of the transaction cell (520A) and populates the transaction cell (520A) with a label (e.g., "Personal") corresponding to a transaction group. In one embodiment of the invention, identification of which transaction group relies on preset mappings relating a transaction group to the directionality of the swipe gesture. In this example, with the market user (526) swiping towards the left, the transaction group labeled "Personal" is determined as the transaction group to which the market user (526) believes the Burger King transaction should reside.

Figure 5F:
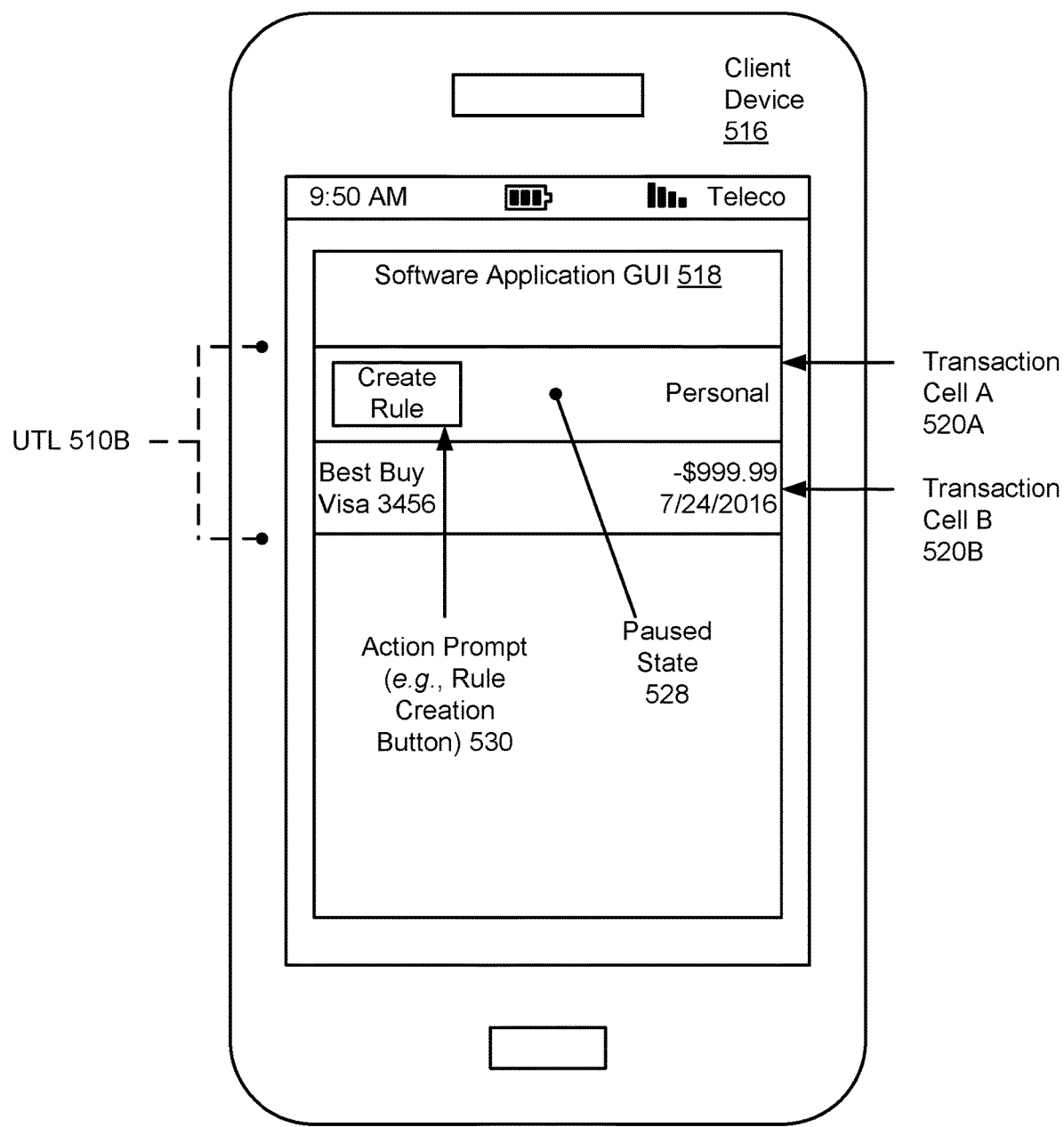

Turning to FIG. 5F, the TTE (not shown) behind the software application GUI (518) next determines that the pause criterion has been met and triggers the transitioning of the transaction cell (520A) into the "paused state" (528). For the sake of simplicity, consider that the pause criterion in this example specified that the intent to assign any transaction to any transaction group was required for a transaction cell to transition to the "paused state" (528). With this requirement met, an action prompt (530) in the form of a rule-creation button is introduced within the transaction cell (520A) while in the "paused state" (528). The action prompt (528) serves to provide the market user with one or more action(s) that entail at least the transaction corresponding to the transaction cell (520A). However, the action prompt (528) is only made available to the market user for a limited duration of time, which is handled by an SPT for the transaction cell (520A).

Figure 5G:
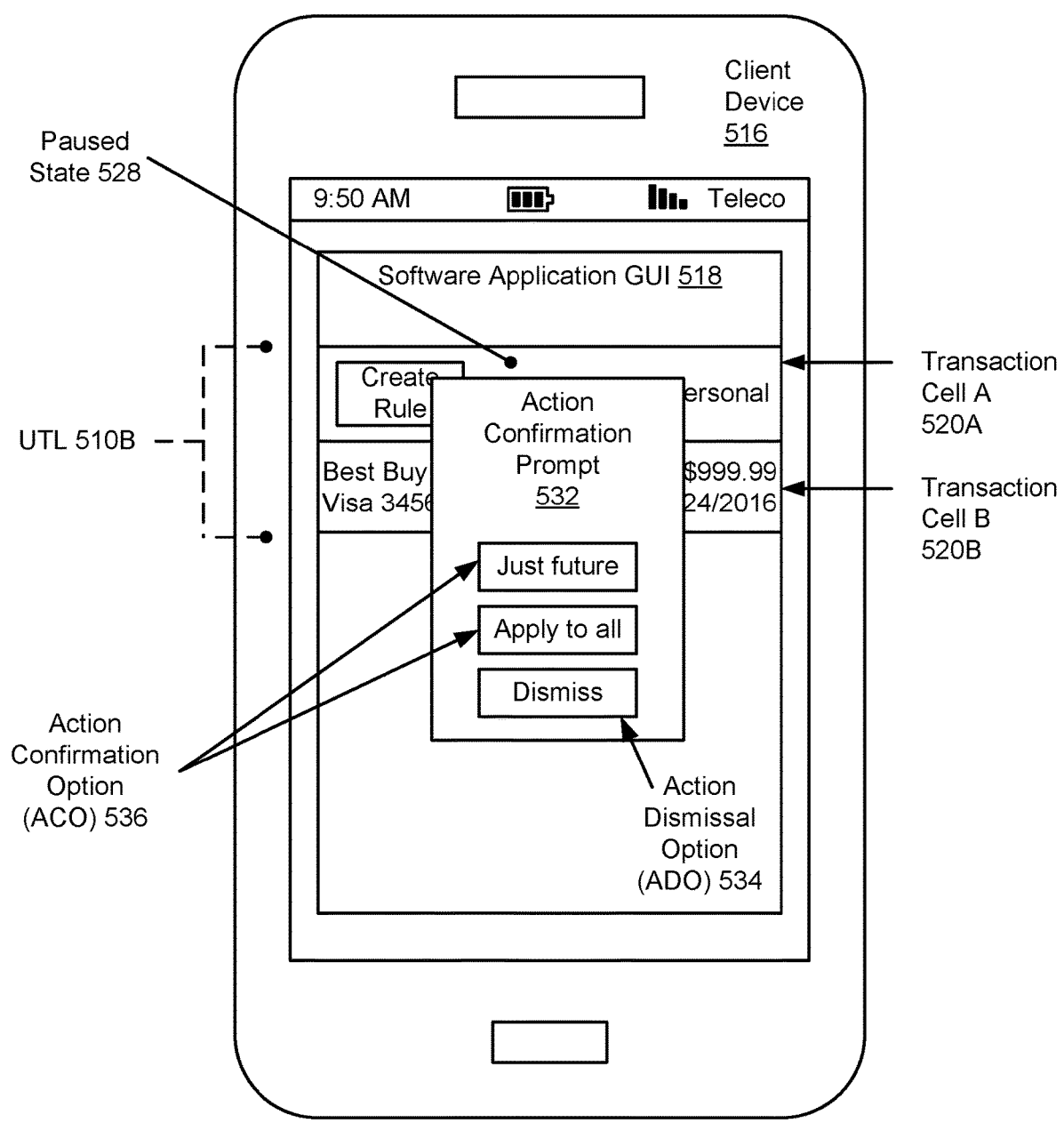

Turning to FIG. 5G, within the allotted time specified by the SPT, the market user proceeds in engaging the action prompt. In response to the engagement, an action confirmation prompt (532) is rendered on the software application GUI (518). During the appearance of the action confirmation prompt (532), in one embodiment of the invention, the Burger King transaction cell (520A) remains in the "paused state" (528). In one embodiment of the invention, the action confirmation prompt (532) may be rendered over the UTL (510B). Further, the action confirmation prompt (532) presents multiple options to the market user with respect to rule-creation. The options include: (i) a "Just future" ACO (536), which when engaged, would create a rule that affects only future transactions that include a specified common transaction detail with the Burger King transaction; (ii) an "Apply to all" ACO (536), which when engaged, would create a rule that affects any existing and future transactions that include a specified common transaction detail with the Burger King transaction; and (iii) an ADO (534), which when engaged, would undo the rule-creation process.

Figure 5H:
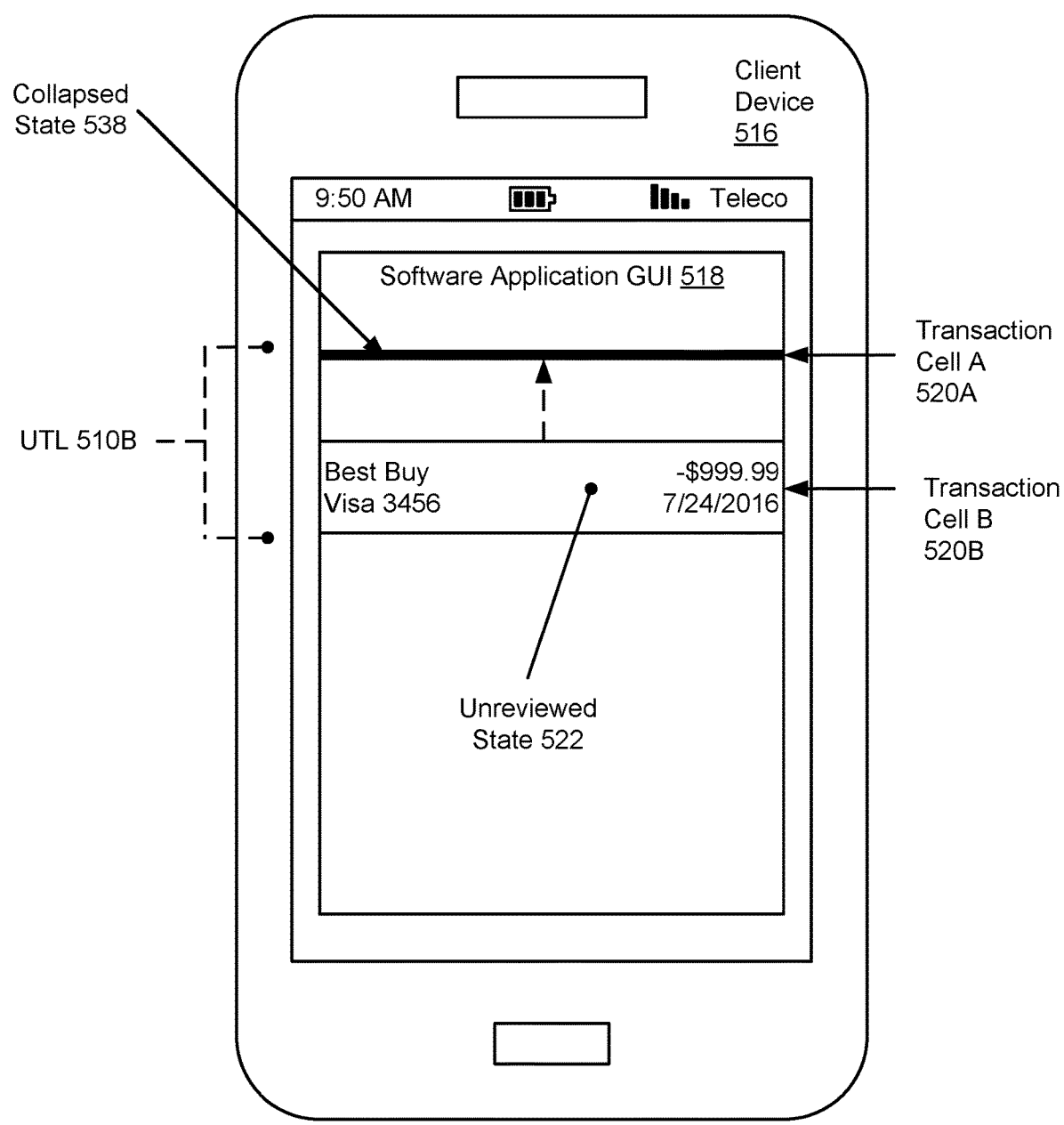

Turning to FIG. 5H, the market user decides to create a rule entailing assignment of all (e.g., existing and future) transactions that include the transaction detail "Burger King" to the "Personal" transaction group. With this decision, the market user engages the "Apply to all" ACO. In one embodiment of the invention, the specified common transaction detail (e.g., "Burger King") may be any of the transaction detail(s) included in the Burger King transaction. In one embodiment of the invention, user preferences and/or the TTS/TTE may have selected the transaction detail relating to the vendor involved in the transaction as the specified common transaction detail. In another embodiment of the invention, an additional prompt may be realized when either of the two ACO is engaged. In one embodiment of the invention, the additional prompt may be a list box that includes all the transaction details associated with the transaction, thereby providing the market user with the opportunity to select the desired transaction detail(s) that is to become the specified common transaction detail. With the ACO engaged, the market user observes that on the software application GUI (518), the Burger King transaction cell (520A) has transitioned into the "collapsed state" (538), subsequently, removing the transaction cell (520A) from the UTL (510B). Any remaining transaction cells (e.g., Best Buy transaction cell (520B)) may subsequently move up in the UTL (510B) and still rendered in the "unreviewed state" (522).

Figure 5I:
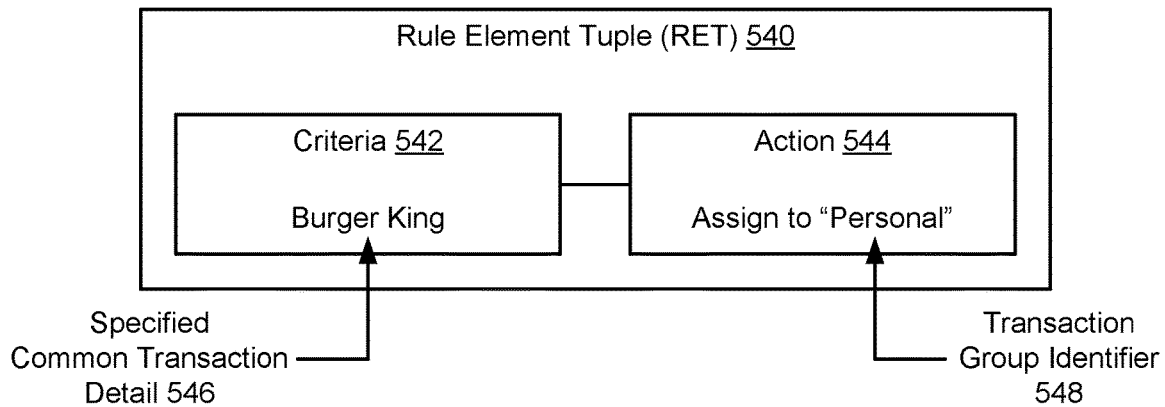

Turning to FIG. 5I, behind the scenes, a RET (540) is generated using input and/or engagements from the market user. The RET (540), as mentioned above, includes criteria (542) and a corresponding action (544). The selected/identified specified common transaction detail (546) (e.g., "Burger King") is set as the criteria (542) for applying the corresponding rule. That is, any existing or future transactions that includes "Burger King" as the vendor involved in the transaction meets the criteria (542). Based on the market user's assignment of the Burger King transaction towards the transaction group associated with the "Personal" transaction group identifier (548), the action (544) specifies that if the criteria (542) are met by a transaction, the transaction is to be assigned to the transaction group associated with the "Personal" transaction group identifier (548).

Figure 5J:
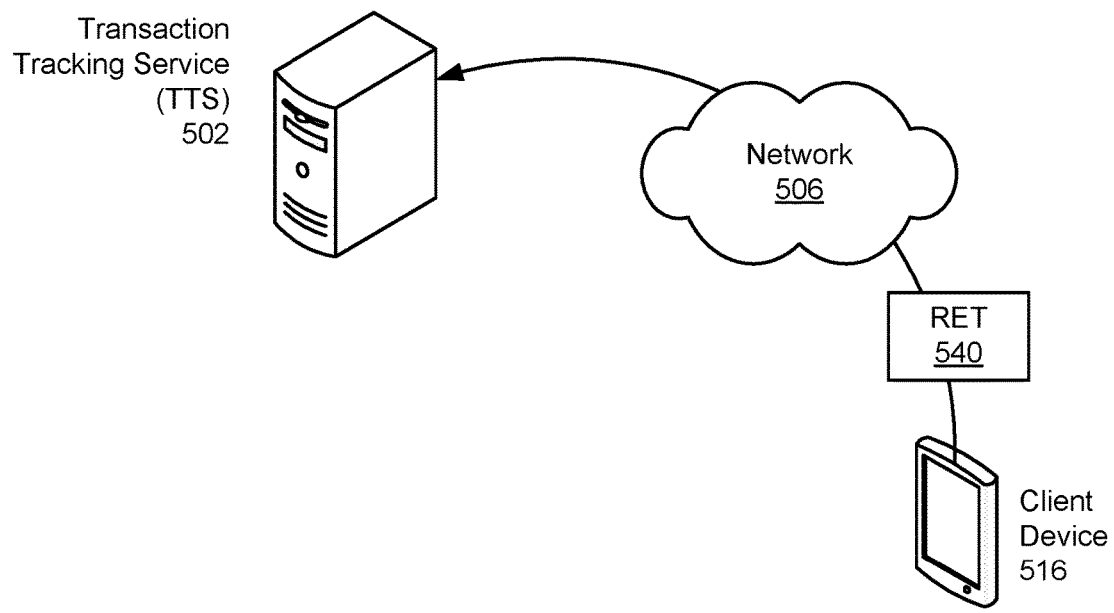
Figures 5K, 5L:
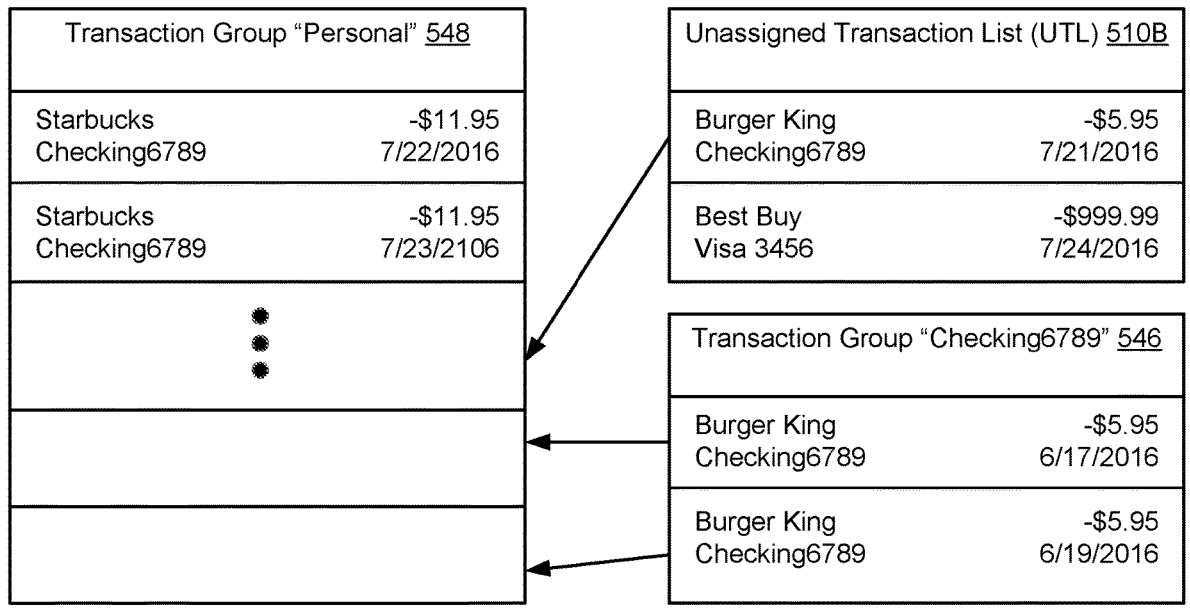

Turning to FIG. 5J, having generated the RET (540), the TTE (not shown) executing on the client device (516) uploads/transmits the RET (540), through the network (506), to the TTS (502). In one embodiment of the invention, synchronization with the TTS (502) may be necessary to complete the rule-creation process. Turning to FIG. 5K, upon receiving the RET (540), the TTS updates the rule table (512) using the (new) RET (540). In one embodiment of the invention, updating the rule table (512) may include generating a new table entry (e.g., Entry No. 4) that includes the criteria and action specified in the RET (540). In another embodiment of the invention (not shown), updating the rule table (512) may include consolidating the action specified in the new RET (540) into an existing entry of the RETs (514) if the criteria in the new RET (540) matches criteria specified in the existing entry of the RETs (514).

Turning to FIG. 5L, from here, the TTS takes the transaction record corresponding to the Burger King transaction in the UTL (510B) and assigns the transaction record to the transaction group associated with the "Personal" transaction group identifier (548). Further, since the new RET (540) (and subsequently, the new rule) mandates that any existing transactions that include "Burger King" as the specified common transaction detail be assigned to the transaction group associated with the "Personal" transaction group identifier (548), the TTS searches for any existing transactions within its transaction repository that meet the criteria. The TTS, having found two additional transactions that include "Burger King" as a transaction detail, which had been pre-assigned to another transaction group—the transaction group associated with "Checking6789" transaction group identifier (546)—then transfers the associated transaction records for those two additional transactions to the transaction group associated with the "Personal" transaction group identifier (548).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A transaction tracking service (TTS), comprising:
a computer processor;
a transaction repository operatively connected to the computer processor, the transaction repository configured to store a plurality of transaction records organized within a plurality of transaction groups; and
a rule table operatively connected to the computer processor, the rule table including a first rule table entry storing a first rule element tuple (RET), wherein the first RET comprises two or more attributes for execution or application of a rule to the plurality of transaction records,
wherein the computer processor is configured to execute instructions to:
make a first determination that a first transaction record of the plurality of transaction records is unassigned of the plurality of transaction groups,
generate, based on the first determination, an unassigned transaction list (UTL) comprising a first set of transaction data associated with the first transaction record,
transmit the UTL to a client device operatively connected to the TTS,
execute a web-based application to generate, on a display screen, a graphical user interface (GUI) of the UTL, wherein the GUI includes a first transaction cell corresponding to the first transaction record,
receive, via the GUI, a first user interaction with the first transaction cell that initiates a categorization of the first transaction record,
execute, responsive to the first user interaction, the web-based application to generate the GUI to display, within the first transaction cell, a rule-creation button executable to create a corresponding rule,
receive a second user interaction with the rule-creation button,
generate, responsive to the second user interaction, a second GUI over the GUI, wherein the second GUI displays a selection of selectable rules,
receive a third user interaction with a selectable rule among the selection of selectable rules,
receive, after transmitting the UTL and responsive to the third user interaction, a second RET from the client device, wherein the second RET comprises an updated two or more attributes for execution or application of the selectable rule to the plurality of transaction records,
update, using the second RET, the rule table to generate an updated rule table, and
assign, using the updated rule table, the first transaction record to a second transaction group specified in the second RET.

2. The TTS of claim 1, wherein the first RET is generated by:
receiving the first RET from the client device.

3. The TTS of claim 2, wherein the second GUI comprises an action confirmation option (ACO) prompt.

4. The TTS of claim 1, wherein the computer processor is further configured to assign pre-assigned transaction records to different transaction groups.

5. The TTS of claim 1, wherein the UTL comprises multiple transactions.

6. The TTS of claim 5, wherein the RET corresponds to more than one transaction of the multiple transactions.

7. The TTS of claim 1, wherein the two or more attributes are selected from the group consisting of: a criteria that triggers an execution of a rule, a set of actions to be performed upon meeting the criteria, and an identifier for a table to which the rule applies.

8. The TTS of claim 1, wherein the second RET includes a criteria that does not match any other criteria or sets of conditions corresponding to existing rule table entries in the first RET.

9. The TTS of claim 8, wherein the computer processor is further configured to:
generate a new rule table entry to include the two or more attributes contained in the second RET.

10. The TTS of claim 1, wherein the second RET includes a matching criteria or a set of conditions corresponding to an existing rule table entry in the first RET.

11. The TTS of claim 10, wherein the computer processor is further configured to:
append or replace listed rules in the existing rule table entry in the first RET, based on the second RET.

12. The TTS of claim 1, wherein the computer processor is further configured to execute instructions to remove the second GUI from the display screen.

13. The TTS of claim 12, wherein the computer processor is configured to execute instructions to transition, on the GUI, the first transaction cell to a collapsed state.

14. A transaction tracking service (TTS), comprising:
a computer processor;
a transaction repository operatively connected to the computer processor, the transaction repository configured to store a plurality of transaction records organized within a plurality of transaction groups; and
a rule table operatively connected to the computer processor, the rule table including a first rule table entry storing a first rule element tuple (RET), wherein the first RET comprises two or more attributes for execution or application of a rule to the plurality of transaction records,
wherein the computer processor is configured to execute instructions to:
make a first determination that a first transaction record of the plurality of transaction records is unassigned and a second transaction record of the plurality of transaction records is unassigned,
generate, based on the first determination, an unassigned transaction list (UTL) comprising a first set of transaction data associated with the first transaction record and a second set of transaction data associated with the second transaction record,
obtain a third set of transaction data from a third-party system,
generate a third transaction record using the third set of transaction data,
perform a comparison between the third set of transaction data and the first RET,
make a second determination, based on the comparison, that the third set of transaction data meets criteria specified in the first RET,
assign, based on the second determination, the third transaction record to a first transaction group specified in the first RET,
transmit the UTL to a client device operatively connected to the TTS,
execute a web-based application to generate, and a display screen, a graphical user interface (GUI) having a first transaction cell corresponding to the second transaction record in the UTL, and to generate the GUI to display, within the first transaction cell, a rule-creation button executable to create the rule,
receive, via the GUI, a first user interaction with the first transaction cell that initiates a categorization of the first transaction record,
receive a second user interaction with the rule-creation button,
generate, responsive to the second user interaction, a second GUI over the GUI, wherein the second GUI displays a selection of selectable rules,
receive a third user interaction with a selectable rule among the selection of selectable rules,
receive, after transmitting the UTL and responsive to the third user interaction, a second RET from the client device, wherein the second RET comprises an updated two or more attributes for execution or application of the selectable rule to the plurality of transaction records,
update, using the second ret, the rule table to generate an updated rule table, and
assign, using the updated rule table, the second transaction record to a second transaction group specified in the second RET.

15. The TTS of claim 14, wherein the computer processor is further configured to:
update the first RET to generate an updated RET.

16. The TTS of claim 15, wherein the computer processor is further configured to:
reassign a pre-assigned transaction record to a different transaction group based on the updated RET.

17. The TTS of claim 15, wherein the computer processor is further configured to:
undo an assignment of the first transaction record based on the updated RET.

18. The TTS of claim 14, wherein the computer processor is further configured to execute instructions to remove the second GUI from the display screen.

19. The TTS of claim 18, wherein the computer processor is configured to execute instructions to transition, on the GUI, the first transaction cell to a collapsed state.

* * * * *